(12) United States Patent
Hamajima

(10) Patent No.: US 8,221,534 B2
(45) Date of Patent: *Jul. 17, 2012

(54) INK-JET INK SET, PRODUCING METHOD OF INK-JET INK SET, IMAGE FORMING METHOD, AND INK-JET RECORDING APPARATUS

(75) Inventor: Tomoyo Hamajima, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 988 days.

This patent is subject to a terminal disclaimer.

(21) Appl. No.: 11/931,058

(22) Filed: Oct. 31, 2007

(65) Prior Publication Data

US 2008/0102258 A1    May 1, 2008

(30) Foreign Application Priority Data

Nov. 1, 2006  (JP) ................. 2006-297733
Aug. 2, 2007  (JP) ................. 2007-201631

(51) Int. Cl.
*C09D 11/02* (2006.01)
(52) U.S. Cl. .............. 106/31.13; 106/31.27; 106/31.6
(58) Field of Classification Search .............. 106/31.13, 106/31.27, 31.6
See application file for complete search history.

(56) References Cited

U.S. PATENT DOCUMENTS

| | | | |
|---|---|---|---|
| 3,336,285 A | 8/1967 | Towne et al. | |
| 3,853,895 A | 12/1974 | Lamm et al. | |
| 3,907,769 A | 9/1975 | Dehnert et al. | |
| 3,950,321 A | 4/1976 | Dehnert et al. | |
| 3,998,802 A | 12/1976 | Dehnert et al. | |
| 4,016,152 A | 4/1977 | Dehnert et al. | |
| 4,042,578 A | 8/1977 | Dehnert et al. | |
| 4,068,085 A | 1/1978 | Ramanathan et al. | |
| 4,128,545 A | 12/1978 | Dehnert et al. | |
| 5,144,015 A | 9/1992 | Chapman | |
| 5,591,514 A | 1/1997 | Hirose et al. | |
| 5,599,386 A | 2/1997 | Sano et al. | |
| 5,609,673 A | 3/1997 | Takimoto et al. | |
| 5,939,210 A | 8/1999 | Hirose et al. | |
| 6,365,720 B1 | 4/2002 | Schacht et al. | |
| 6,444,807 B1 | 9/2002 | Wolleb et al. | |
| 6,495,250 B1 | 12/2002 | Schacht et al. | |
| 7,108,743 B2 | 9/2006 | Fujiwara et al. | |
| 7,109,336 B2 | 9/2006 | Fijiwara et al. | |
| 7,147,698 B2 | 12/2006 | Patel | |
| 7,201,477 B2 | 4/2007 | Taguchi et al. | |
| 7,211,134 B2 | 5/2007 | Tateishi et al. | |
| 7,713,343 B2* | 5/2010 | Goto et al. | 106/31.48 |
| 7,727,321 B2* | 6/2010 | Goto et al. | 106/31.48 |
| 7,736,424 B2* | 6/2010 | Hamajima et al. | 106/31.27 |
| 7,736,425 B2* | 6/2010 | Kato et al. | 106/31.27 |
| 2003/0105321 A1 | 6/2003 | Wolleb et al. | |
| 2005/0104944 A1 | 5/2005 | Robertson et al. | |
| 2006/0016026 A1 | 1/2006 | Tateishi et al. | |
| 2007/0186806 A1* | 8/2007 | Goto et al. | 106/31.48 |
| 2007/0188573 A1* | 8/2007 | Hamajima et al. | 347/100 |

FOREIGN PATENT DOCUMENTS

| | | |
|---|---|---|
| JP | 4994677 | 9/1974 |
| JP | 59162561 A | 9/1984 |
| JP | 59191068 A | 10/1984 |
| JP | 4974718 | 12/1990 |
| JP | 4304270 A | 10/1991 |
| JP | 5183631 | 2/1993 |
| JP | 7242050 A | 9/1995 |
| JP | 7278478 A | 10/1995 |
| JP | 8073791 A | 3/1996 |
| JP | 8311375 A | 11/1996 |
| JP | 9202043 A | 8/1997 |
| JP | 921555 A | 9/1997 |
| JP | 9235484 A | 9/1997 |
| JP | 200265099 A | 9/2000 |
| JP | 2000303009 A | 10/2000 |
| JP | 2002526589 A | 8/2002 |
| JP | 2002371079 A | 12/2002 |
| JP | 2002371214 A | 12/2002 |
| JP | 2003213168 A | 7/2003 |
| JP | 2003231823 A | 8/2003 |
| JP | 2004002670 A | 1/2004 |
| JP | 2005075778 A | 3/2005 |
| JP | 2005520029 A | 7/2005 |
| JP | 2006503148 A | 1/2006 |
| JP | 2006028450 A | 2/2006 |
| WO | WO0017275 | 3/2000 |

OTHER PUBLICATIONS

Heterocyclic Synthesis, vol. 20, No. 3, 1983.

* cited by examiner

*Primary Examiner* — Jerry Lorengo
*Assistant Examiner* — Veronica F Faison
(74) *Attorney, Agent, or Firm* — Baker Botts L.L.P.

(57) ABSTRACT

The present disclosure relates to ink-jet ink compositions, systems, and/or methods including a yellow ink, a magenta ink and a cyan ink for producing ink-jet printed matter having desirable color balance (e.g., difference in percent residual optical densities (ODs) between individual colors) and/or color retention (e.g., percent residual OD) following contact with water. For example, the absolute value of the difference in a percent residual OD of an image produced in accordance with some embodiments of the disclosure may be less than about 20%. The percent residual OD of an image produced in accordance with some embodiments of the disclosure may be more than about 40%.

27 Claims, No Drawings

INK-JET INK SET, PRODUCING METHOD OF INK-JET INK SET, IMAGE FORMING METHOD, AND INK-JET RECORDING APPARATUS

This application claims the benefit of Japanese Patent Application No. 2006-297733, filed Nov. 1, 2006 and Japanese Patent Application No. 2007-201631, filed Aug. 2, 2007, both of which are incorporated herein by reference.

BACKGROUND

1. Field of the Disclosure

The present disclosure relates to compositions, systems, and methods for ink-jet recording comprising, for example, an ink-jet ink set, a manufacturing method of the same, an image forming method, and an ink-jet recording apparatus.

2. Description of Related Art

In an ink-jet recording system, a full color image showing a clear and good water resistance property is commonly formed on a specialized ink-jet paper comprising a base sheet having an ink-receiving layer. Such specialized paper may be more expensive to manufacture than plain paper not having an ink-receiving layer. This expense has been a barrier to reducing manufacturing costs of ink-jet recording. Therefore, in ink-jet recording systems, plain paper is still widely used as a medium to be recorded (see JP-A-7-242050 (the term "JP-A" as used herein refers to an "unexamined published Japanese patent application")).

However, a drawback to recording an ink-jet image on plain paper is that upon contact with water, the colors undesirably bleed indicating that water resistance of the image is poor and/or insufficient. Accordingly, it is desired to improve water resistance of an image formed on plain paper by ink-jet recording. Due, at least in part, to limitations of plain paper, however, problems with printing on plain paper persist.

SUMMARY

According to some embodiments of the disclosure, compositions, systems, and methods for forming an image on plain paper by ink-jet recording may produce an image with improved color retention (e.g., percent residual optical density ("percent residual OD")) and/or color balance (e.g., absolute value of the difference in percent residual ODs between individual colors) following contact with water.

In connection with a printed matter printed on plain paper with every ink constituting an ink-jet ink set, the present inventors paid attention to the residual rates of optical density values before and after a prescribed water resistance test. The present inventors have found that an image with improved water resistance may be achieved in some embodiments by using a composition, system, and/or method with colored inks (e.g., in an ink-jet ink set) having less than a prescribed difference in percent residual OD by a water resistance test.

The present disclosure provides, in some embodiments, an ink-jet ink set comprising a yellow ink, a magenta ink and a cyan ink, wherein absolute value of the difference in percent residual OD by a water resistance test in any two inks is less than about 20%. Here, "a percent residual OD by a water resistance test" may be defined as the percent fraction of an optical density value of a printed matter (e.g., an image) printed on plain paper with every ink remaining after exposure to water (e.g., compared to the OD value before exposure).

According to some embodiments, the disclosure also relates to methods of manufacturing an ink-jet ink set comprising at least a yellow ink, a magenta ink and a cyan ink, which comprises selecting and combining a yellow ink, a magenta ink and a cyan ink so that the absolute value of the difference in a percent residual OD by a water resistance test in any two inks may be less than about 20%.

The disclosure, in some embodiments, further relates to image forming methods comprising jetting each ink of an ink-jet ink set comprising a yellow ink, a magenta ink and a cyan ink from an ink-jet head to plain paper to obtain an image capable of retaining a desired color balance following exposure to water. For example, a yellow ink, a magenta ink and a cyan ink, may be selected such that the absolute value of the difference in a percent residual OD by a water resistance test in all the inks of less than about 20%.

In some embodiments, the disclosure relates to ink-jet recording apparatuses comprising an ink cartridge comprising an ink selected from a yellow ink, a magenta ink, a cyan ink and/or combinations thereof (e.g., each ink may be contained in a separate cartridge or each ink may be contained in a separate tank within a single cartridge). An ink jet recording apparatus may further include an ink-jet head(s) for jetting ink fed from the ink cartridge(s). Inks for an ink jet recording apparatus may be selected such that the absolute value of the difference in a percent residual OD by a water resistance test in any two inks (e.g., on plain paper) may be less than about 20%.

An ink set, according to some embodiments of the disclosure, may be constituted such that the absolute value of the difference in a percent residual OD by a water resistance test between any two inks may be less than about 20%. A printed matter obtained by printing on paper (e.g., plain paper) with the ink set may have good discoloration balance upon contact with water. Further, according to a manufacturing method of an ink set, each ink may be manufactured such that the absolute value of the difference in a percent residual OD by a water resistance test in all of a yellow ink, a magenta ink and a cyan ink may be less than about 20%. Accordingly, the obtained ink set shows the same effect of the disclosure as the ink set in the disclosure. In addition, an image-forming method and/or an ink-jet recording apparatus, in some embodiments of the disclosure, may use an ink set formulated according to one or more embodiments of the disclosure, so that an image obtained by ink-jet recording on paper (e.g., plain paper) is retains a desirable color balance following contact with water.

DETAILED DESCRIPTION

An ink set, according to some embodiments of the disclosure, may comprise at least a yellow ink, a magenta ink and a cyan ink. If desired and/or necessary, an ink set may comprise one or more of a black ink, a light yellow ink, a light magenta ink, a light cyan ink, a red ink, a green ink and/or the like.

Water resistance, in some embodiments, may refer to resistance to and/or prevention of any type of ink bleeding, blurring, spreading, and/or extraction (collectively "blurring") by a solvent (e.g., water).

Water resistance may be expressed, in some embodiments, as ratio of the optical density before and after exposure to water. For example, water resistance may be expressed as a percent residual OD calculated by dividing the optical density of an image after exposure to water by the optical density before exposure to water and multiplying by 100. A percent residual OD may be calulated for one or more inks of the ink set. According to some embodiments, the absolute value of the difference in percent residual OD of any two inks (e.g., $|OD_{yellow} - OD_{magenta}|$, $|OD_{yellow} - OD_{cyan}|$, $|OD_{magenta} - OD_{cyan}|$, and the like) may be less than about 20%, less than about 15%, less than about 10%, less than about 5%, and/or more than about 1%. In some embodiments, the absolute value of the difference in percent residual OD of any two inks may be within a range of about 1% to about 5%, about 1% to about 10%, about 1% to about 15%, about 1% to about 20%, about 5% to about 10%, about 5% to about 15%, about 5% to about 20%, about 10% to about 15%, and/or about 10% to about 20%. When the difference is about 20% or more, the coloration balance following contact with water of the printed matter on paper (e.g., plain paper) may be undesirable.

According to some embodiments of the disclosure, examples of a plain paper may include any toner transfer papers for electrophotographic recording usually used in offices (e.g., PPC paper, copying paper) and ordinary high quality papers (e.g., refer to JP-A-59-162561, JP-A-59-191068, and/or the like), not having an ink-receiving layer. For example, plain paper may include recycled copying paper Green 100 (manufactured by Fuji Xerox Co., Ltd.), office paper W (manufactured by Fujitsu CoWorCo Limited) and/or the like. Paper, in some embodiments, may include plain paper, thesis paper, posterboard, cardstock, adhesive label paper, and/or cardboard.

According to some embodiments, a water resistance test for an image formed by ink-jet recording on paper (e.g., plain paper) may comprise immersing at least a portion of the image and associated paper in 4 liters of pure water (e.g., conductivity: 3 µS/cm or less) at 25° C. for 5 minutes, and then subjecting the image/paper to natural drying (e.g., under about room temperature and ambient air conditions). Printed matter to be tested may comprise a solid print printed on plain paper (office paper W, manufactured by Fujitsu CoWorCo Limited) with a digital multifunction device (DCP-110C, manufactured by Brother Industries, Ltd.) mounting an ink-jet recording apparatus by resolution of 600×600 dpi. An optical density value (OD) may be measured with Spectrolino (manufactured by Gretag Macbeth AG) (light source: $D_{65}$, angle of visibility: 2°, status A).

In an ink set of the disclosure, when a percent residual OD by a water resistance test of each ink is small, water resistance of the printed matter may be poor and/or insufficient. In some embodiments of the disclosure, a percent residual OD of an image on paper (e.g., plain paper) may be about 40% or more, about 50% or more, and/or about 80% or more.

In some embodiments, a colorant for use in a yellow ink (e.g., comprised in an ink set) may comprise direct dyes and acid dyes generally used in an ink-jet ink set. For example, a desirable colorant for use in a yellow ink may comprise C.I. Direct Yellow 132, C.I. Direct Yellow 86, C.I. Acid Yellow 23 and/or the like. The amount of colorants in the yellow ink may be about 0.1 wt % to about 20 wt % and/or about 0.5 wt % to about 10 wt %, based on all the amount of the yellow ink.

A colorant for use in a magenta ink (e.g., comprised in an ink set), according to some embodiments, may comprise direct dyes and acid dyes generally used in an ink-jet ink set. For good light fastness and/or ozone resistance, it may be desirable to use a magenta dye (1) represented by the general formula (1), a free acid form of a magenta dye (2) represented by the general formula (2), and/or a magenta dye (3) represented by the chemical formula (3). The amount of colorants in the magenta ink is about 0.1 wt % to about 20 wt %, and about 0.5 wt % to about 10 wt %, based on all the amount of the magenta ink.

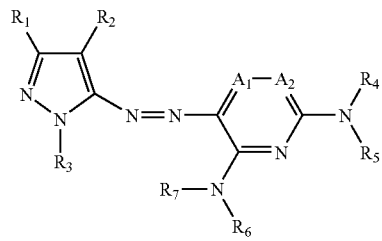

General Formula (1)

In the general formula (1), $R_1$ represents a hydrogen atom, an optionally substituted alkyl group, or an optionally substituted aryl group; $R_2$ represents a hydrogen atom, a halogen atom, or a cyano group; $R_3$ represents a hydrogen atom, an optionally substituted alkyl group, an optionally substituted aryl group, or an optionally substituted heterocyclic group; $R_4$, $R_5$, $R_6$ and $R_7$ each represents a hydrogen atom, an optionally substituted alkyl group, an optionally substituted aryl group, an optionally substituted heterocyclic group, an optionally substituted sulfonyl group, or an optionally substituted acyl group, provided that $R_4$ and $R_5$ do not represent a hydrogen atom at the same time; and $A_1$ and $A_2$ each represents an optionally substituted carbon atom, or either one of $A_1$ and $A_2$ represents an optionally substituted carbon atom and the other represents a nitrogen atom.

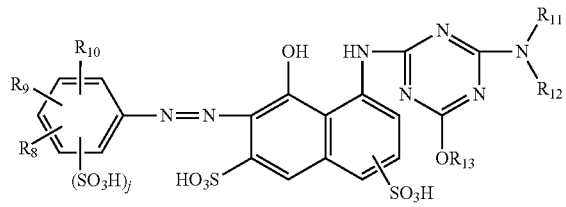

General Formula (2)

In the general formula (2), $R_8$, $R_9$ and $R_{10}$ each represents an optionally substituted alkyl group, an optionally substituted alkoxyl group, a halogen atom, a hydrogen atom, a hydroxyl group, an optionally substituted carbamoyl group, an optionally substituted sulfamoyl group, an optionally substituted amino group, a nitro group, a sulfonate group, an optionally substituted alkylsulfonyl group, an optionally substituted arylsulfonyl group, a carboxyl group, or a carboxylate group; j represents a number of 0, 1 or 2; $R_{11}$, $R_{12}$ and $R_{13}$ each represents a hydrogen atom, an optionally substituted alkyl group, an optionally substituted alkenyl group, an optionally substituted aryl group, an optionally substituted aralkyl group, an optionally substituted alicyclic group, or an optionally substituted heterocyclic group.

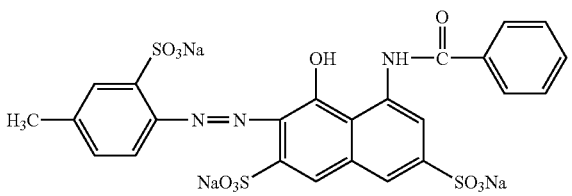

Chemical Formula (3)

The substituents represented by $R_1$ to $R_7$, $A_1$ and $A_2$ in the general formula (1) will be described below.

Examples of halogen atoms in the general formula (1) may include, without limitation, a fluorine atom, a chlorine atom, a bromine atom and/or the like.

Examples of alkyl groups in the optionally substituted alkyl groups in the general formula (1) may include, without limitation, alkyl groups having 1 to 6 carbon atoms. Examples of substituents may include, without limitation, a hydroxyl group, an alkoxyl group (a methoxy group, an ethoxy group, etc.), a cyano group, a halogen atom (a fluorine atom, a chlorine atom, a bromine atom, etc.), and an ionic hydrophilic group (a carboxylic acid salt, a sulfonic acid salt, etc.). Examples of optionally substituted alkyl groups may include, without limitation, a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group and/or the like.

Examples of aryl groups in the optionally substituted aryl groups in the general formula (1) may include, for example, aryl groups having 6 to 12 carbon atoms exclusive of the carbon atoms in the substituent. Examples of substituents may include, without limitation, an alkyl group (a methyl group, an ethyl group, an isopropyl group, a tert-butyl group, an n-octyl group, etc.), an alkoxyl group (refer to the above description), a halogen atom (refer to the above description), an alkylamino group (a methylamino group, a dimethylamino group, etc.), an amido group, a carbamoyl group, a sulfamoyl group, a sulfoamido group, a hydroxyl group, an ester group (a methoxycarbonyl group, an ethoxycarbonyl group, etc.), and an ionic hydrophilic group (refer to the above description). Examples of optionally substituted aryl groups may include, without limitation, a phenyl group, a naphthyl group, a p-tolyl group, a p-octylphenyl group, a mesityl group, a p-methoxyphenyl group, an o-chlorophenyl group, an m-(3-sulfopropylamino)phenyl group and/or the like.

Examples of heterocyclic groups in the optionally substituted heterocyclic groups in the general formula (1) may include, for example, 5- or 6-membered heterocyclic groups. Examples of substituents may include, without limitation, an amido group, a carbamoyl group, a sulfamoyl group, a sulfoamido group, a hydroxyl group, an ester group (refer to the above description), and an ionic hydrophilic group (refer to the above description). Examples of optionally substituted heterocyclic groups may include, without limitation, a 2-pyridyl group, a 2-thienyl group, a 2-thiazolyl group, a 2-benzothiazolyl group, a 2-furyl group, a 6-sulfobenzothiazolyl group, a 6-sulfonatebenzothiazolyl group and/or the like.

Examples of substituents of the optionally substituted sulfonyl groups in the general formula (1) may include, without limitation, an alkyl group (refer to the above description), an aryl group (refer to the above description), and/or the like. Examples of optionally substituted sulfonyl groups may include, without limitation, a methylsulfonyl group, a phenylsulfonyl group and/or the like.

Examples of acyl groups in the optionally substituted acyl groups in the general formula (1) may include, for example, acyl groups having 1 to 12 carbon atoms exclusive of the carbon atoms in the substituent. Examples of substituents may include, without limitation, ionic hydrophilic groups (refer to the above description). Examples of optionally substituted acyl groups may include, without limitation, an acetyl group, a benzoyl group, and a chloroacetyl group.

In the general formula (1), as described above, $A_1$ and $A_2$ each represents an optionally substituted carbon atom, or either one of $A_1$ and $A_2$ represents an optionally substituted carbon atom and the other represents a nitrogen atom. Where both $A_1$ and $A_2$ represent a carbon atom excellent performance may be obtained. Examples of substituents bonding to the carbon atoms represented by $A_1$ and $A_2$ may include, without limitation, an alkyl group having 1 to 3 carbon atoms, a carboxyl group, a carbamoyl group, a cyano group and/or the like.

In the general formula (1), $R_4$ and $R_5$ do not represent a hydrogen atom at the same time, and also $R_6$ and $R_7$ do not represent a hydrogen atom at the same time. Further, when the number of substituents in the sulfonic acid group or carboxyl group increases, water solubility tends to increase. Accordingly, the number of substituents may be adjusted as desired and/or required.

A magenta dye (1), in some embodiments, may comprise a magenta dye represented by the general formula (1), wherein $R_1$ is an alkyl group, $R_2$ is a cyano group, $R_3$ is a hydrogen atom or an optionally substituted heterocyclic group, $R_4$ is a hydrogen atom, an optionally substituted heterocyclic group, or a substituted aryl group, $R_5$ and $R_6$ each is a substituted heterocyclic group, or a substituted aryl group, $R_7$ is a hydrogen atom, $A_1$ is a substituted carbon atom, and $A_2$ is an optionally substituted carbon atom.

According to some embodiments, an example of a magenta dye (1) is a magenta dye represented by the general formula (1), wherein $R_1$ is a tert-butyl group, $R_2$ is a cyano group, $R_3$ is a hydrogen atom, or a benzothiazolyl group optionally substituted with a sulfonic acid group or the alkali metal salt group thereof (e.g., a benzothiazol-2-yl group), $R_4$ is a hydrogen atom, a benzothiazolyl group optionally substituted with a sulfonic acid group or the alkali metal salt group thereof (e.g., a benzothiazol-2-yl group), or a trialkylphenyl group substituted with a sulfonic acid group or the alkali metal salt group thereof (e.g., a mesityl group), $R_5$ and $R_6$ each is a mono- or trialkylphenyl group optionally substituted with a sulfonic acid group or the alkali metal salt group thereof (e.g., a p-octylphenyl group or a mesityl group), or a benzothiazolyl group substituted with a sulfonic acid group or the alkali metal salt group thereof (e.g., a benzothiazol-2-yl group), $R_7$ is a hydrogen atom, $A_1$ is a carbon atom substituted with an alkyl group (e.g., a methyl group), and $A_2$ is a carbon atom optionally substituted with a cyano group.

Examples of magenta dyes (1) may include, without limitation, compounds represented by any of the following chemical formulae (1-A) to (1-E).

Chemical Formula (1-A)

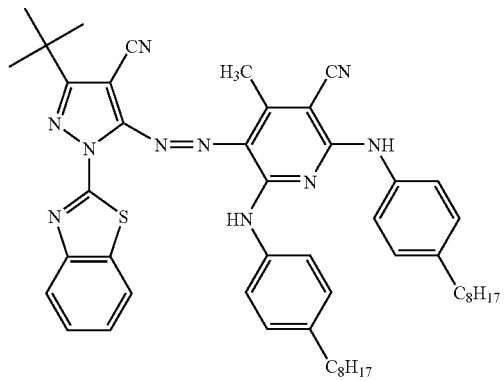

The compound represented by the chemical formula (1-A) is an embodiment of the magenta dye represented by the general formula (1), wherein $R_1$ is a tert-butyl group, $R_2$ is a cyano group, $R_3$ is a benzothiazol-2-yl group, $R_4$ is a hydrogen atom, $R_5$ and $R_6$ are each a p-octylphenyl group, $R_7$ is a hydrogen atom, $A_1$ is a carbon atom substituted with a methyl group, and $A_2$ is a carbon atom substituted with a cyano group.

Chemical Formula (1-B)

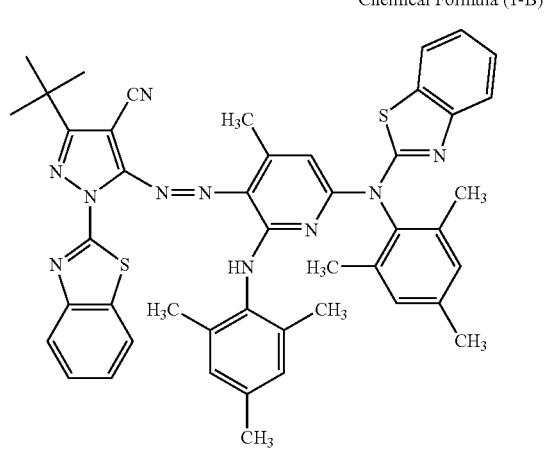

The compound represented by the chemical formula (1-B) is an embodiment of the magenta dye represented by the general formula (1), wherein $R_1$ is a tert-butyl group, $R_2$ is a cyano group, $R_3$ and $R_4$ are each a benzothiazol-2-yl group, $R_5$ and $R_6$ are each a mesityl group, $R_7$ is a hydrogen atom, $A_1$ is a carbon atom substituted with a methyl group, and $A_2$ is a carbon atom.

Chemical Formula (1-C)

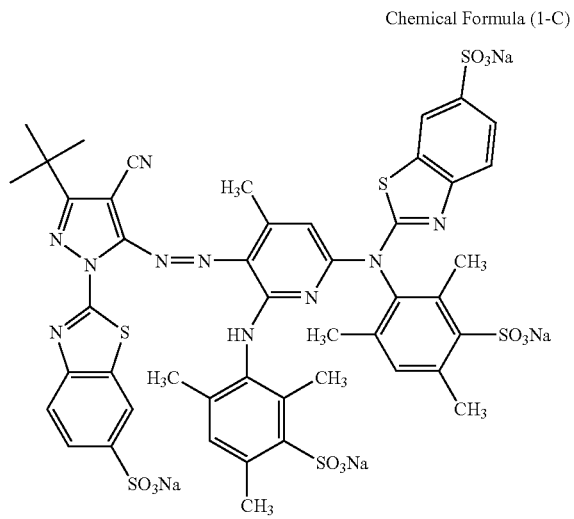

The compound represented by the chemical formula (1-C) is an embodiment of the magenta dye represented by the general formula (1), wherein $R_1$ is a tert-butyl group, $R_2$ is a cyano group, $R_3$ and $R_4$ are each a sodium salt 6-sulfobenzothiazol-2-yl group, $R_5$ and $R_6$ are each a sodium salt 3-sulfomesityl group, $R_7$ is a hydrogen atom, $A_1$ is a carbon atom substituted with a methyl group, and $A_2$ is a carbon atom.

Chemical Formula (1-D)

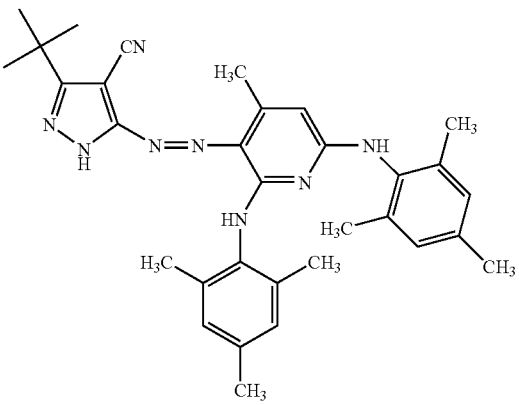

The compound represented by the chemical formula (1-D) is an embodiment of the magenta dye represented by the general formula (1), wherein $R_1$ is a tert-butyl group, $R_2$ is a cyano group, $R_3$ and $R_4$ are each a hydrogen atom, $R_5$ and $R_6$ are each a mesityl group, $R_7$ is a hydrogen atom, $A_1$ is a carbon atom substituted with a methyl group, and $A_2$ is a carbon atom.

Chemical Formula (1-E)

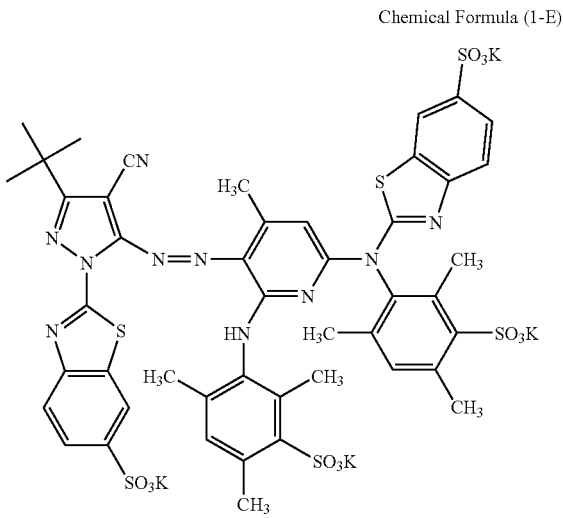

The compound represented by the chemical formula (1-E) is an embodiment of the magenta dye represented by the general formula (1), wherein $R_1$ is a tert-butyl group, $R_2$ is a cyano group, $R_3$ and $R_4$ are each a potassium salt 6-sulfobenzothiazol-2-yl group, $R_5$ and $R_6$ are each a potassium salt 3-sulfomesityl group, $R_7$ is a hydrogen atom, $A_1$ is a carbon atom substituted with a methyl group, and $A_2$ is a carbon atom.

A magenta dye (1) represented by the general formula (1) may be produced according to the steps (a) to (c) described below.

Step (a):

A diazonium salt is formed through reaction of aminopyrazole represented by the following chemical formula (1a) and a diazotization agent. As the diazotization agent, a dilute aqueous solution of hydrochloric acid of sodium nitrite may be used. Isopentyl nitrite and nitrosylsulfuric acid may also be used.

Chemical Formula (1a)

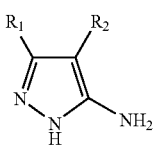

The substituents $R_1$ and $R_2$ in the chemical formula (1a) are as described in the magenta dye (1). Aminopyrazole represented by the chemical formula (1a) may be synthesized according to the methods described in U.S. Pat. No. 3,336, 285, *Heterocycles,* 20, 519 (1983), and JP-B-6-19036 (the term "JP-B" as used herein refers to an "examined Japanese patent publication").

Step (b):

Subsequently, a compound represented by the following chemical formula (1c) is formed by the reaction of the diazonium salt formed in the step (a) with a coupling agent represented by the following chemical formula (1b).

Chemical Formula (1b)

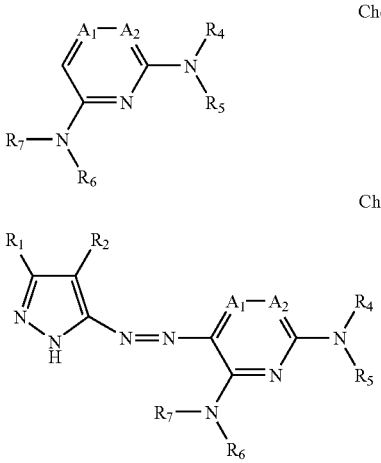

Chemical Formula (1c)

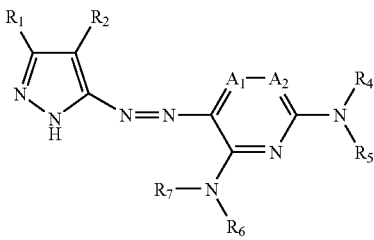

The substituents represented by $R_1$ to $R_7$ in the chemical formulae (1b) and (1c) are the same as those described in the general formula (1). The pyridine-based coupling agent represented by the chemical formula (1c) may be synthesized according to the methods disclosed in JP-A-51-83631, JP-A-49-74718 and JP-B-52-46230.

Step (c):

Subsequently, a magenta dye (1) represented by the general formula (1) may be obtained through the reaction of the compound formed in the step (b) with an alkylating agent and an arylating agent or a heterylating agent in the presence of a base. As the bases for use in the step, organic bases such as diisopropylethylamine and/or the like; and inorganic bases such as potassium carbonate, sodium carbonate, sodium hydrogencarbonate, potassium hydrogencarbonate, sodium hydroxide, potassium hydroxide and/or the like may be used. The alkylating agent is a compound represented by "R—X", wherein R is an optionally substituted alkyl group; X represents a halogen atom or $OSO_2R'$; and R' represents an alkyl group, an aryl group such as a phenyl group or the like. The arylating agent is a compound represented by "Ar—X", wherein Ar is a phenyl group substituted with an electron attractive group (the total of σp values of Hammett may be substituted with 0.2 or more substituents). A heterylating agent may be a compound represented by "Het-X", wherein Het is a heterocyclic ring, e.g., a 2-pyridyl group, a 2-thienyl group, a 2-thiazolyl group, a 2-benzothiazolyl group, a triazyl group, a 2-furyl group and/or the like.

The substituents represented by $R_8$ to $R_{13}$ in the general formula (2) are described below.

A description is given of the substituents represented by $R_8$, $R_9$ and $R_{10}$ in the general formula (2). Examples of optionally substituted alkyl groups may include, without limitation, an alkyl group having 1 to 9 carbon atoms in total. Examples of such alkyl groups include, without limitation, a methyl group, an ethyl group, an n-propyl group, an isopropyl group, an n-butyl group, a trifluoromethyl group, a dimethylaminomethyl group and/or the like. Examples of optionally substituted alkoxy groups may include, without limitation, an alkoxy group having 1 to 9 carbon atoms in total. Examples of such alkoxy groups include, without limitation, a methoxy group, an isopropoxy group, an n-butoxy group and/or the like. Examples of halogen atoms may include, without limitation, a fluorine atom, a chlorine atom, a bromine atom and/or the like. Examples of optionally substituted carbamoyl groups may include, without limitation, a carbamoyl group, an N,N-dimethylcarbamoyl group, a phenylcarbamoyl group and/or the like. Examples of optionally substituted sulfamoyl groups may include, without limitation, a sulfamoyl group, an N-methylsulfamoyl group, an N-ethylsulfamoyl group, an N-ethyl-N-phenylsulfamoyl group, an N,N-dimethylsulfamoyl group, a p-carboxyphenylsulfamoyl group and/or the like. Examples of optionally substituted amino groups include, without limitation, an N-methylamino group, a carbamoylamino group, an N,N-diethylamino group, an acetylamino group and/or the like. Examples of sulfonate groups may include, without limitation, a phenoxysulfonyl group and/or the like. Examples of optionally substituted alkylsulfonyl groups may include, without limitation, an alkylsulfonyl group having 1 to 9 carbon atoms in total. Examples of such alkylsulfonyl groups include, without limitation, a hydroxyethylsulfonyl group and/or the like. Examples of optionally substituted arylsulfonyl groups may include, without limitation, an arylsulfonyl group having 6 to 15 carbon atoms in total. Examples of such arylsulfonyl groups include, without limitation, a benzylsulfonyl group and/or the like. Examples of carboxylate groups may include, without limitation, a methoxycarboxyl group and/or the like.

A description will be given of the substituents represented by $R_{11}$, $R_{12}$ and $R_{13}$ in the general formula (2). Examples of optionally substituted alkyl groups may include, without limitation, an alkyl group having 1 to 18 carbon atoms in total. Examples of such alkyl groups include, without limitation, an ethyl group, an n-butyl group, an n-octyl group, an ethylhexyl group, a hydroxyethyl group, a carboxypropyl group, a carboxycyclohexylmethyl group, a 1-carboxy-2-mercaptoethyl group, a 1-carboxy-2-carbamoyl-ethyl group, a 1-isopropyl-1-carboxymethyl group, a 1,2-dicarboxypropyl group and/or the like. Examples of optionally substituted alkenyl groups may include, without limitation, an alkenyl group having 2 to 18 carbon atoms in total. Examples of such alkenyl groups include, without limitation, a 2-methyl-1-propenyl group, a vinyl group, an allyl group and/or the like. Examples of optionally substituted aryl groups include, without limitation, a 3,4-dicarboxyphenyl group, a 4-butylphenyl group, a 4-carboxyphenyl group and/or the like. Examples of optionally substituted aralkyl groups include, without limitation, a benzyl group, a 1-carboxy-2-phenylethyl group, a 1-carboxy-2-hydroxyphenylethyl group, a 4-carboxy-benzyl group and/or the like. Examples of optionally substituted alicyclic groups include, without limitation, a cyclohexyl group, a 4-carboxycyclohexyl group and/or the like. Examples of optionally substituted heterocyclic groups may include, without limitation, a pyridyl group, a thiadiazolyl group, a benzo-thiazolyl group, a 2,2,6,6-tetramethylpiperidinyl group and/or the like. Further, at least one of $R_{11}$, $R_{12}$ and $R_{13}$ may be an alkyl, alkenyl, aryl, alicyclic, aralkyl, or heterocyclic group substituted with one to four carboxyl or sulfamoyl groups. Moreover, $R_{11}$ and $R_{12}$ may be each independently a hydrogen atom or a trisubstituted phenyl group. In this instance, the three substituents of the trisubstituted phenyl group are each independently a hydrogen atom, a halogen atom, a hydroxyl group, an optionally substituted alkyl group having 1 to 9 carbon atoms in total, an optionally substituted alkoxy group having 1 to 9 carbon atoms in total, an optionally substituted carbamoyl group, an optionally substituted sulfamoyl group, an optionally substituted amino group, a nitro group, a sulfonate group, or a carboxylate group.

An example of a magenta dye (2), in some embodiments, is a magenta dye represented by the general formula (2), wherein at least one of $R_{11}$, $R_{12}$ and $R_{13}$ is an alkyl, alkenyl, aryl, aralkyl, or cyclohexyl group substituted with one to four carboxyl or sulfamoyl groups.

In a magenta dye (2) represented by the general formula (2), the total number of sulfonic acid, carboxyl, sulfonate and carboxylate groups in its structure may be six or less, five or less, and/or four or less. Further, the magenta dye (2) may be used in the free acid form. However, when the magenta dye (2) is obtained in a salt form during manufacturing, it may be used without conversion or may be converted into a desired salt form. Moreover, a part of the acid groups may be in a salt form, and both a salt-form colorant and a free acid-form colorant may be present. The examples of such salt forms include, without limitation, salts of alkali metals such as Na, Li, K and/or the like, ammonium salts optionally substituted with an alkyl group or a hydroxyalkyl group, and salts of organic amines. Examples of organic amines may include, without limitation, a lower alkylamine, a hydroxy-substituted lower alkylamine, a carboxy-substituted lower alkylamine, a polyamine having 2 to 10 alkyleneimine units each having 2 to 4 carbon atoms and/or the like. The number of the types of these salts used in not limited to one, and a plurality of types of the salts may be present.

Another example of a magenta dye (2) is a magenta dye represented by the general formula (2), wherein j is 0; $R_8$ is a carboxyl group, a carbamoyl group, a trifluoromethyl group, or a sulfamoyl group; $R_9$ and $R_{10}$ are each a hydrogen atom; $R_{11}$ is a carboxyalkyl group or a phenyl group optionally substituted with a carboxyl group or a sulfamoyl group; $R_{12}$ is a hydrogen atom; and $R_{13}$ is a hydrogen atom or an alkyl group.

Examples of a magenta dye (2) may include, but not limited to, the compounds represented by any of the chemical formulas (2-A) to (2-E) below.

Chemical Formula (2-A)

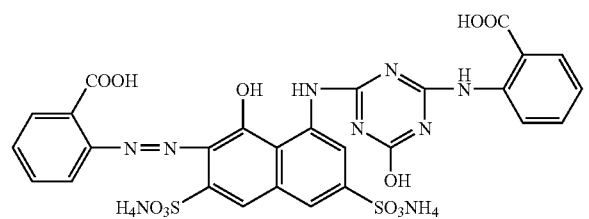

The compound represented by the chemical formula (2-A) is an embodiment of the magenta dye (2), wherein, in the general formula (2), j is 0; $R_8$ is a carboxyl group at the 2-position of the phenyl group bonded to the azo group; $R_9$, $R_{10}$ and $R_{12}$ are each a hydrogen atom; $R_{11}$ is a 2-carboxyphenyl group; and $R_{13}$ is a hydrogen atom.

Chemical Formula (2-B)

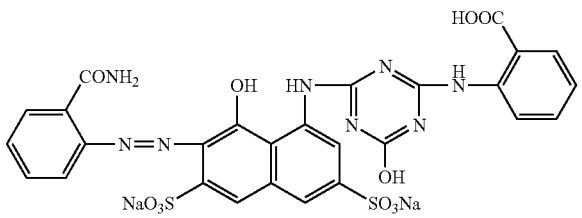

The compound represented by the chemical formula (2-B) is another embodiment of the magenta dye (2), wherein, in the general formula (2), j is 0; $R_8$ is a carbamoyl group at the 2-position of the phenyl group bonded to the azo group; $R_9$, $R_{10}$ and $R_{12}$ are each a hydrogen atom; $R_{11}$ is a 2-carboxyphenyl group; and $R_{13}$ is a hydrogen atom.

Chemical Formula (2-C)

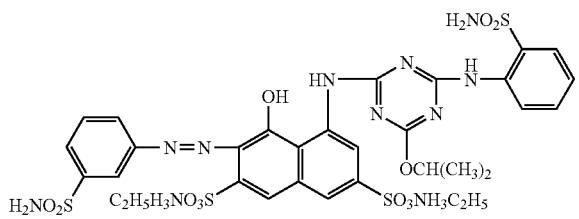

The compound represented by the chemical formula (2-C) is yet another embodiment of the magenta dye (2), wherein, in the general formula (2), j is 0; $R_8$ is a sulfamoyl group at the 3-position of the phenyl group bonded to the azo group; $R_9$, $R_{10}$ and $R_{12}$ are each a hydrogen atom; $R_{11}$ is a 2-sulfamoylphenyl group; and $R_{13}$ is an isopropyl group.

Chemical Formula (2-D)

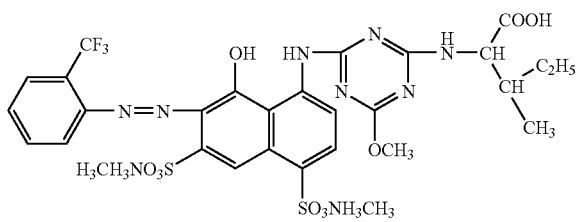

The compound represented by the chemical formula (2-D) is another embodiment of the magenta dye (2), wherein, in the general formula (2), j is 0; $R_8$ is a trifluoromethyl group at the 2-position of the phenyl group bonded to the azo group; $R_9$, $R_{10}$ and $R_{12}$ are each a hydrogen atom; $R_{11}$ is a 1-carboxy-2-methylbutyl group; and $R_{13}$ is a methyl group.

Chemical Formula (2-E)

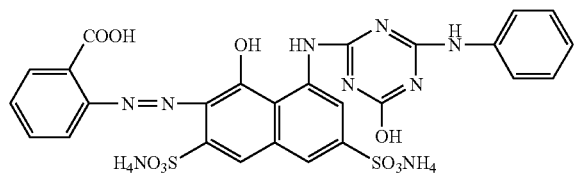

The compound represented by the chemical formula (2-E) is an embodiment of the magenta dye (2), wherein, in the general formula (2), j is 0; $R_8$ is a carboxyl group at the 2-position of the phenyl group bonded to the azo group; $R_9$, $R_{10}$ and $R_{12}$ are each a hydrogen atom; $R_{11}$ is a phenyl group; and $R_{13}$ is a hydrogen atom.

A magenta dye (2) represented by the general formula (2) may be produced by a known method. For example, a magenta dye (2) may be produced according to the following steps (A) to (C).

Step (A):

A monoazo compound is produced from 2-aminobenzoic acid (anthranilic acid) and 1-amino-8-hydroxy-3,6-naphthalenedisulfonic acid (H acid) according to a routine method (see, for example, Yutaka Hosoda, *SHIN SENRYO KAGAKU* (*New Dye Chemistry*), pp. 396 to 409, published by Gihodo (Dec. 21, 1973)) through diazotization and coupling reaction.

Step (B):

The obtained monoazo compound is added to a cyanuric chloride suspension and allowed to react for several hours. At this time, the reaction mixture is maintained at a pH of 4 to 6 and a temperature of 0° C. to 5° C. Subsequent to this reaction, an aqueous solution of 2-aminobenzoic acid (anthranilic acid) is added to the reaction mixture at room temperature in order to prevent the reaction mixture from becoming alkaline, and the reaction mixture is subjected to condensation reaction for several hours. Subsequently, a 25% aqueous solution of sodium hydroxide is added to the reaction mixture at 50° C. to 60° C. to make the reaction mixture strong alkaline, thereby effecting a hydrolysis reaction. Thus, the reaction is completed.

Step (C):

After the reaction, the reaction mixture is cooled and is subjected to salting out with sodium chloride, thereby obtaining the magenta dye (2).

In some embodiments, a colorant for use in a cyan ink (e.g., comprised in an ink set) may comprise direct dyes and acid dyes generally used in an ink-jet ink set. Light fastness and ozone resistance may be obtained using a cyan dye (4) represented by the general formula (4), and/or a cyan dye (5) represented by the general formula (5). The amount of colorants in the cyan ink may be about 0.1 wt % to about 20 wt % and/or about 0.5 wt % to about 10 wt %, based on all the amount of the cyan ink.

General Formula (4)

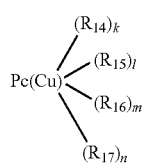

General Formula (5)

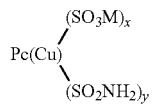

General Formula (6)

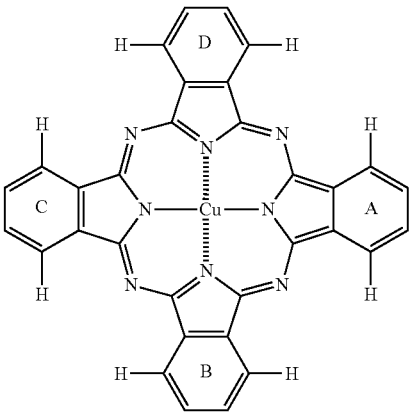

In the general formulae (4) and (5), Pc(Cu) represents a copper phthalocyanine nucleus represented by the general formula (6).

In the general formula (4), $R_{14}$, $R_{15}$, $R_{16}$ and $R_{17}$ each represents a substituent selected from —$SO_2$—$R_a$, —$SO_2NR_bR_c$, and —$CO_2$—$R_a$, and not all of $R_{14}$, $R_{15}$, $R_{16}$ and $R_{17}$ are the same. However, at least one of $R_{14}$, $R_{15}$, $R_{16}$ and $R_{17}$ has an ionic hydrophilic group as the substituent. One or more of $R_{14}$, $R_{15}$, $R_{16}$ and $R_{17}$ is (are) present on each of the four benzene rings A, B, C and D in the copper phthalocyanine nucleus represented by the general formula (6). $R_a$ represents a substituted or unsubstituted alkyl group; $R_b$ represents a hydrogen atom, or a substituted or unsubstituted alkyl group; and $R_c$ represents a substituted or unsubstituted alkyl group. k is a number satisfying the relationship of $0<k<8$; l is a number satisfying the relationship of $0<l<8$; m is a number satisfying the relationship of $0\leq m<8$; and n is a number satisfying the relationship of $0\leq n<8$; and k, l, m and n are numbers satisfying the relationship of $4\leq k+l+m+n\leq 8$.

In the general formula (5), an $SO_3M$ group and an $SO_2NH_2$ group are present on any of the four benzene rings A, B, C and D in the copper phthalocyanine nucleus represented by the general formula (6). Here, M represents a monovalent metallic cation selected from a lithium ion, a sodium ion and a potassium ion. x is a number satisfying the relationship of $0<x<4$; y is a number satisfying the relationship of $0<y<4$, and x and y are numbers satisfying the relationship of $2\leq x+y<5$.

The substituents $R_{14}$ to $R_{17}$, Pc(Cu), and k, l, m and n in the general formula (4) will be described below.

In the general formula (4), examples of substituted and/or unsubstituted alkyl groups represented by $R_a$, $R_b$ and $R_c$ may include, without limitation, a straight chain, branched, and/or alicyclic alkyl group having 1 to 12 carbon atoms. In some embodiments, a branched alkyl group, for example, an alkyl group having an asymmetric carbon atom (e.g., as a racemic modification) may be used to increase solubility and/or ink stability.

Examples of substituents of the substituted alkyl groups represented by $R_a$, $R_b$ and $R_c$ may include, without limitation, a straight or branched chain alkyl group having 1 to 12 carbon atoms, a straight or branched chain aralkyl group having 7 to 18 carbon atoms, a straight or branched chain alkenyl group having 2 to 12 carbon atoms, a straight or branched chain alkynyl group having 2 to 12 carbon atoms, a straight or branched chain cycloalkyl group having 3 to 12 carbon atoms, a straight or branched chain cycloalkenyl group having 3 to 12 carbon atoms (groups having a branched chain and/or groups having an asymmetric carbon atom, e.g., methyl, ethyl, propyl, isopropyl, sec-butyl, tert-butyl, 2-ethylhexyl, 2-methylsulfonylethyl, 3-phenoxypropyl, trifluoromethyl, and/or cyclopentyl may increase dye solubility and/or ink stability), a halogen atom (e.g., a chlorine atom, a bromine atom), an aryl group (e.g., phenyl, 4-tert-butylphenyl, 2,4-di-tert-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxyl group, an amino group, an alkyloxy group (e.g., methoxy, ethoxy, 2-methoxyethoxy, 2-methenesulfonylethoxy), an aryloxy group (e.g., phenoxy, 2-methylphenoxy, 4-tert-butylphenoxy, 3-nitrophenoxy, 3-tert-butyloxycarbamoylphenoxy, 3-methoxy-carbamoyl), an acylamino group (e.g., acetamide, benzamide, 4-(3-tert-butyl-4-hydroxyphenoxy)butanamide), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethylthio), an arylthio group (e.g., phenylthio, 2-butoxy-5-tert-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfon-amido) a carbamoyl group (e.g., N-ethylcarbamoyl, N,N-dibutylcarbamoyl), a sulfamoyl group (e.g., N-ethyl-sulfamoyl, N,N-dipropylsulfamoyl, N-phenylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g., 1-phenyltetrazole-5-oxy, 2-tetrahydropyranyl-oxy), an azo group (e.g., phenylazo, 4-methoxyphenylazo, 4-pivaloylaminophenylazo, 2-hydroxy-4-propanoylphenylazo), an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-diphenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxy-carbonyl), an acyl group (e.g., acetyl, 3-phenylpropanoyl, benzoyl), and an ionic hydrophilic group (e.g., carboxyl, sulfo, phosphono, and quaternary ammonium groups). A hydroxyl group, groups having an ether bond and/or an ester bond, a cyano group, and/or a sulfonamido group may heighten the associating property and fastness of dye. In addition to these, a halogen atom and/or an ionic hydrophilic group may be used.

Examples of substituted or unsubstituted alkyl groups represented by $R_a$, $R_b$ and $R_c$ may include, without limitation, a methyl group, an ethyl group, an n-butyl group, an isopropyl group, a tert-butyl group, a hydroxyethyl group, a methoxyethyl group, a cyanoethyl group, a trifluoromethyl group, a 3-sulfopropyl group, and a 4-sulfobutyl group.

An example of a cyan dye (4) is a cyan dye represented by the general formula (4), wherein $R_{14}$, $R_{15}$, $R_{16}$ and $R_{17}$ are each a substituent represented by $-SO_2-R_a$. $R_a$ of each of $R_{14}$, $R_{15}$, $R_{16}$ and $R_{17}$ is a substituted or unsubstituted alkyl group, however, all of the substituted or unsubstituted alkyl groups of these four $R_a$s are not necessarily completely the same. Here, "all are not necessarily completely the same" means that at least two kinds of $R_a$s are present on the assumption that at least one of four $R_a$s is a substituted alkyl group having an ionic hydrophilic group.

Another example of a cyan dye (4) is a cyan dye represented by the general formula (4), wherein k is a number satisfying the relationship of 0<k<4; l is a number satisfying the relationship of 0<l<4; m is a number satisfying the relationship of 0≦m<4; and n is a number satisfying the relationship of 0≦n<4; and k, l, m and n are numbers satisfying the relationship of k+l+m+n=4.

Examples of a cyan dye (4) may include, without limitation, the compounds represented by any of the following chemical formulae (4-A) to (4-E).

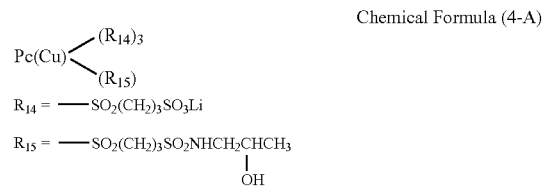

Chemical Formula (4-A)

The compound represented by the chemical formula (4-A) is an embodiment of the cyan dye (4), wherein, in the general formula (4), $R_{14}$ is a lithium sulfonatopropylsulfonyl group, $R_{15}$ is an N-(2-hydroxypropyl)sulfamoylpropylsulfonyl group, k is 3, l is 1, and m and n are both 0.

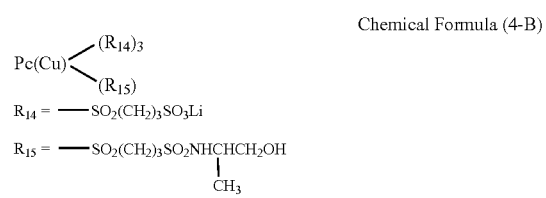

Chemical Formula (4-B)

The compound represented by the chemical formula (4-B) is an embodiment of the cyan dye (4), wherein, in the general formula (4), $R_{14}$ is a lithium sulfonatopropylsulfonyl group, $R_{15}$ is an N-(2-hydroxyisopropyl)sulfamoylpropylsulfonyl group, k is 3, l is 1, and m and n are both 0.

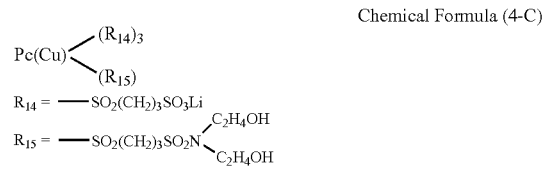

Chemical Formula (4-C)

The compound represented by the chemical formula (4-C) is an embodiment of the cyan dye (4), wherein, in the general formula (4), $R_{14}$ is a lithium sulfonatopropylsulfonyl group, $R_{15}$ is an N,N-[di(2-hydroxyethyl)]sulfamoylpropylsulfonyl group, k is 3, l is 1, and m and n are both 0.

Chemical Formula (4-D)

-continued

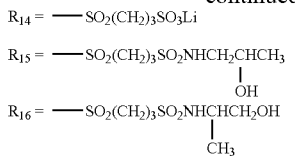

The compound represented by the chemical formula (4-D) is an embodiment of the cyan dye (4), wherein, in the general formula (4), $R_{14}$ is a lithium sulfonatopropylsulfonyl group, $R_{15}$ is an N-(2-hydroxypropyl)sulfamoylpropylsulfonyl group, $R_{16}$ is an N-(2-hydroxyisopropyl)sulfamoylpropylsulfonyl group, k is 2, l is 1, m is 1, and n is 0.

Chemical Formula (4-E)

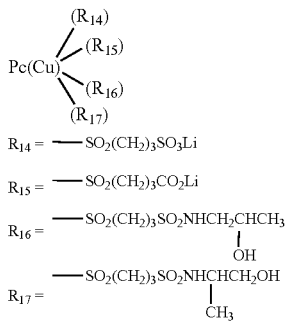

The compound represented by the chemical formula (4-E) is an embodiment of the cyan dye (4), wherein, in the general formula (4), $R_{14}$ is a lithium sulfonatopropylsulfonyl group, $R_{15}$ is a lithium carboxylatopropylsulfonyl group, $R_{16}$ is an N-(2-hydroxypropyl)sulfamoylpropylsulfonyl group, $R_{17}$ is an N-(2-hydroxyisopropyl)sulfamoylpropylsulfonyl group, and k, l, m and n are all 1.

The producing method of the cyan dye (4) represented by the general formula (4) is described below. In general, as disclosed in JP-T-2002-526589 (the term "JP-T" as used herein means a published Japanese translation of a PCT patent application) (corresponding to WO 00/17275), in the case of an unsubstituted phthalocyanine compound, a sulfo group may be relatively easily introduced to a phthalocyanine nucleus by sulfonation. When a sulfonated phthalocyanine compound is used as a water-soluble dye, by salt-forming the sulfo group with an alkali metal hydroxide, for example, a sodium hydroxide, the resulting solfonate may be used as a dye as it is. In this case, it is possible that sulfonation occurs at arbitrary position of the phthalocyanine nucleus, in addition, the control of the number of sulfo groups to be introduced is difficult. Accordingly, when a phthalocyanine compound is sulfonated without controlling the reaction conditions of sulfonation, specifying the position and/or the number of the sulfo groups introduced to a product may be difficult, so that a mixture of compounds differing in the position and/or number of substituents may be obtained. To improve ozone resistance of the cyan dye (4), it may be desired and/or necessary to avoid producing a mixture of products. Accordingly, it may be desirable and/or necessary to introduce a specific substituent into phthalic acid derivative in advance and synthesize copper phthalocyanine from the substituted phthalic acid derivative and a copper derivative such as $CuCl_2$ and/or the like. A method of synthesizing copper phthalocyanine from a phthalic acid derivative and a copper derivative is disclosed in JP-A-2000-303009 and/or the like.

Examples of cyan dyes (5) may include, without limitation, compounds represented by any of the following chemical formulae (5-A) to (5-C).

Chemical Formula (5-A)

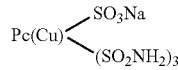

The compound represented by the chemical formula (5-A) is an embodiment of the cyan dye (5), wherein, in the general formula (5), M is a sodium ion; x is 1; y is 3; and one substituent is present on each of the four benzene rings A, B, C and D of the copper phthalocyanine nucleus represented by the general formula (6).

Chemical Formula (5-B)

The compound represented by the chemical formula (5-B) is another embodiment of the cyan dye (5), wherein, in the general formula (5), M is a sodium ion; both x and y are 2; and one substituent is present on each of the four benzene rings A, B, C and D of the copper phthalocyanine nucleus represented by the general formula (6).

Chemical Formula (5-C)

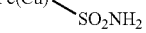

The compound represented by the chemical formula (5-C) is yet another embodiment of the cyan dye (5), wherein, in the general formula (5), M is a sodium ion; x is 3; y is 1; and one substituent is present on each of the four benzene rings A, B, C and D of the copper phthalocyanine nucleus represented by the general formula (6).

The cyan dye (5) represented by the general formula (5) may be produced by a known copper phthalocyanine substitution method comprising, for example, the following steps (i), (ii) and (iii) or by other method.

Step (i):

Copper phthalocyanine is chlorosulfonated with a chlorosulfonating agent. For example, an agent comprising a mixture of chlorosulfonic acid and a chlorinating agent (phosphorus oxychloride or phosphorus trichloride) may be used as the chlorosulfonating agent. The molar ratio of the chlorosulfonic acid to the copper phthalocyanine compound (chlorosulfonic acid:copper phthalocyanine compound) may be within the range of from about 5:1 to about 200:1. The molar ratio of the chlorinating agent to the copper phthalocyanine (chlorinating agent:copper phthalocyanine) may be, for example, within the range of from 0.5:1 to 10:1.

This chlorosulfonation reaction is carried out at a temperature ranging from 90 to 180° C. for 0.5 to 16 hours. The reaction time of the chlorosulfonation generally depends upon the reaction temperature. The reaction time tends to be shorter as the reaction temperature is increased, and the reaction time tends to be longer as the reaction temperature is decreased. The temperature and time for a chlorosulfonation reaction may be in the range of from about 135° C. to about 145° C. for from about 1.5 hours to about 5 hours.

Further, a chlorosulfonating agent may include a sulfuric acid. When a chlorosulfonating agent comprises a sulfuric acid, the molar ratio of sulfuric acid to the copper phthalocyanine compound (sulfuric acid:copper phthalocyanine compound) may be within the range of from about 0.3:1 to about 2:1.

Step (ii):

In the next place, the product obtained in step (i) is condensed with ammonia to obtain a compound represented by the chemical formula (5') shown below.

Chemical Formula (5')

This step is carried out using ammonium hydroxide in an amount of 3 wt % to 35 wt % at a reaction temperature range of from 0° C. to 50° C. The reaction time generally depends upon the reaction temperature. The reaction time tends to be shorter as the reaction temperature is increased, and the reaction time tends to be longer as the reaction temperature is decreased. The temperature and time for a condensation reaction may include a temperature of from about 0° C. to about 45° C. for from about 0.5 hours to about 24 hours.

Step (iii):

In the next place, $NH_4^+$ in the compound represented by the chemical formula (5') and obtained in the step (ii) is replaced with a monovalent metal cation. In this metal cation replacement reaction, replacement may be carried out, for example, according to the following method. In the first place, the product obtained in step (ii) is made acidic (for example, $NH_4^+$ is replaced with $H^+$ with hydrochloric acid). Then, the original cation is removed through dialysis, and a monovalent metal cation is added (for example, an alkali metal hydroxide is added). The copper phthalocyanine-based cyan dye (5) represented by the general formula (5) may be produced through the above steps.

Water and water-soluble organic solvents that are used in each ink of the ink set in the disclosure are described below.

According to some embodiments of the disclosure, water may comprise ion exchange water low in salts. Because water in each ink of an ink set may be formulated as the balance of other components, the amount included may vary depending on the amount of other components. The amount of water may be generally about 10 wt % to 90 wt % and/or about 40 wt % to about 80 wt %.

In some embodiments, a water-soluble organic solvent may comprise a humectant and/or a penetrant. Including a humectant may avoid drying ink at the tip of a nozzle of an ink-jet head. A penetrant may act to control drying speed of ink on paper.

Examples of a humectant include, without limitation, lower alcohols such as methyl alcohol, ethyl alcohol, n-propyl alcohol, isopropyl alcohol, n-butyl alcohol, sec-butyl alcohol, tert-butyl alcohol and/or the like; polyhydric alcohols such as 1,3-butanediol, 1,5-pentanediol, 1,6-hexanediol, glycerin, 1,2,6-hexanetriol, 1,2,4-butanetriol, 1,2,3-butanetriol, pentantriol and/or the like; alkylene glycols such as ethylene glycol, diethylene glycol, triethylene glycol, propylene glycol, dipropylene glycol, tripropylene glycol, butylene glycol, thiodiglycol, hexylene glycol and/or the like; polyalkylene glycols such as polyethylene glycol, polypropylene glycol and/or the like; amides such as formamide, N-methylformamide, N,N-dimethylformamide, dimethylacetamide and/or the like; amines such as monoethanolamine, diethanolamine, triethanolamine, monoethylamine, diethylamine, triethylamine and/or the like; ketones or keto alcohols such as acetone, diacetone alcohol and/or the like; ethers such as tetrahydrofuran, dioxane and/or the like; pyrrolidones such as 2-pyrrolidone, N-methyl-2-pyrrolidone, N-hydroxyethyl-2-pyrrolidone and/or the like; nitrogen-containing heterocyclic compounds such as 1,3-dimethylimidazolidinone, ϵ-caprolactam and/or the like; sulfur-containing compounds such as dimethyl sulfoxide, sulforan, thiodiethanol and/or the like; and/or the like. Examples of humectants may include, for example, polyhydric alcohols such as alkylene glycol, glycerin and/or the like. These humectants may be used alone, or two or more kinds may be used as mixture.

The amount of the humectant in each ink of the ink set may be generally 0 wt % to about 95 wt %, about 10 wt % to about 80 wt %, and/or about 10 wt % to about 50 wt %.

The examples of penetrants include, without limitation, ethylene glycol methyl ether, ethylene glycol ethyl ether, ethylene glycol propyl ether, ethylene glycol butyl ether, diethylene glycol methyl ether, diethylene glycol ethyl ether, diethylene glycol propyl ether, diethylene glycol butyl ether, diethylene glycol dimethyl ether, diethylene glycol diethyl ether, diethylene glycol dipropyl ether, diethylene glycol dibutyl ether, triethylene glycol methyl ether, triethylene glycol ethyl ether, triethylene glycol propyl ether, tiethylene glycol butyl ether, triethylene glycol dimethyl ether, triethylene glycol diethyl ether, triethylene glycol dipropyl ether, triethylene glycol dibutyl ether, propylene glycol methyl ether, propylene glycol ethyl ether, propylene glycol propyl ether, propylene glycol butyl ether, dipropylene glycol methyl ether, dipropylene glycol ethyl ether, dipropylene glycol propyl ether, dipropylene glycol butyl ether, dipropylene glycol dimethyl ether, dipropylene glycol diethyl ether, dipropylene glycol dipropyl ether, dipropylene glycol dibutyl ether, tripropylene glycol methyl ether, tripropylene glycol ethyl ether, tripropylene glycol propyl ether, tripropylene glycol butyl ether, tripropylene glycol dimethyl ether, tripropylene glycol diethyl ether, tripropylene glycol dipropyl ether, tripropylene glycol dibutyl ether and/or the like. These penetrants may be used alone, or two or more kinds may be used as mixture.

The amount of the penetrant in each ink of the ink set may be generally 0 wt % to about 20 wt %, about 0.1 wt % to about 15 wt %, and/or about 1 wt % to about 10 wt %. When an excessive amount of penetrant is contained, the penetrability of the ink to plain paper becomes too high, which may cause blurring.

In some embodiments, each ink of an ink set may comprise, if necessary and/or desired, one or more additives, such as a viscosity modifier, e.g., polyvinyl alcohol, polyvinyl pyrrolidone, water-soluble resin and/or the like; a surface tension modifier; a mildewproofing agent; a pH modifier and/or the like.

Each ink of an ink set, according to some embodiments of the disclosure may be produced by homogeneously blending, according to desire and/or necessity, water, a water-soluble organic solvent, and/or other various kinds of additives with the colorants according to a routine method, and setting the resulting inks. At that time, an exemplified a yellow ink, a magenta ink and a cyan ink may be selected such that the absolute value of the difference in a percent residual OD by a water resistance test in any two inks is less than about 20%, less than about 15%, and the inks are combined to obtain an ink set. In this case, as the yellow ink, the magenta ink and the cyan ink, inks showing the percent residual OD by each water resistance test of about 40% or more are used.

An ink set according to some embodiments of the disclosure may be used in an image-forming method capable of giving an image that retains a desirable color balance following contact with water. An image-forming method may comprise jetting from an ink-jet head each ink of the ink set comprising a yellow ink, a magenta ink and a cyan ink, and adhering the jetted ink on paper (e.g., plain paper) to thereby obtain a printed matter that retains a desirable color balance following contact with water. As the yellow ink, the magenta ink and the cyan ink, the inks are selected such that the absolute value of the difference in a percent residual OD by a water resistance test between any two inks is less than about 20%.

In some embodiments, an ink-jet recording apparatus comprises an ink cartridge comprising an ink selected from a yellow ink, a magenta ink, a cyan ink and/or combinations thereof (e.g., each ink may be contained in a separate cartridge or each ink may be contained in a separate tank within a single cartridge), and an ink-jet head for jetting the ink from at least one of the ink cartridges, wherein the absolute value of the difference in a percent residual OD of any two inks is less than about 20%. Except for using the ink set of the disclosure, in connection with other constituents such as an ink-jet head, the same constituents as those used in conventional ink-jet recording apparatus may be used in the ink-jet recording apparatus.

EXAMPLE

The following examples are provided only to illustrate certain embodiments of the description and are not intended to embody the total scope of the disclosure or any embodiment thereof. Variations of the exemplary embodiments below are intended to be included within the scope of the disclosure.

Examples 1 to 8 and Comparative Examples 1 to 4

Yellow Ink Y1 was obtained by mixing and stirring 3.2 wt % of C.I. Direct Yellow 86, 26 wt % of glycerin, 2 wt % of dipropylene glycol propyl ether, 0.2 wt % of OLFINE® E1010, 0.2 wt % of Proxel XL-2 (S), and 68.4 wt % of water, and filtering the resulting mixture through a hydrophilic PTFE (polytetrafluoroethylene) type membrane filter having a pore size of 0.2 μm (manufactured by Toyo Roshi Kaisha, Ltd.).

In the same manner as in the preparation of Yellow Ink Y1, other inks for ink-jet recording were prepared by homogeneously mixing the ink compositions summarized in Tables 1 to 3.

In the Tables, the dyes (1-D) and (1-E) respectively correspond to the compounds represented by the chemical formulae (1-D) and (1-E), the dyes (2-A) and (2-B) respectively correspond to the compounds represented by the chemical formulae (2-A) and (2-B), the dye (3) corresponds to the compound of the chemical formula (3), the dyes (4-A) and (4-B) respectively correspond to the compounds of the chemical formulae (4-A) and (4-B), and the dyes (5-A) and (5-B) respectively correspond to the compounds represented by the chemical formulae (5-A) and (5-B).

Inks constituting the ink set were filled in cartridges, mounted on an ink-jet printer-mounted digital multifunction device (DCP-110C, the product manufactured by Brother Industries, Ltd.), and printing and evaluation of printing were performed. As the sample for evaluation, a solid print was formed on plain paper (office paper W, manufactured by Fujitsu CoWorCo Limited) by resolution of 600×600 dpi with every ink. Each sample was evaluated for water resistance as follows.

<Evaluation of Residual OD Rate>

After allowing a freshly printed sample image for evaluation to stand overnight at room temperature, an initial optical density (OD) value was measured with Spectrolino (manufactured by Gretag Macbeth AG) (light source: $D_{65}$, angle of visibility: 2°, status A). The results obtained are summarized in Tables 4 to 6. The printed sample was immersed in 4 liters of pure water (conductivity: 3 μS/cm or less) at 25° C. for 5 minutes, taken out of the water, and then subjected to natural drying (e.g., for about 3 hours to about 5 hours). The dried sample for evaluation was again measured for OD value.

The percent residual OD was found with these OD values according to the following equation (1). Further, the percent residual OD was evaluated on the basis of the following criteria. The results obtained are summarized in Tables 4 to 6.

Percent residual OD(%)=[OD value(after water resistance test)/OD value (before water resistance test)]×10    Equation (1)

Grades for Evaluation:

A: The percent residual OD was 40% or more.

B: The percent residual OD was less than 40%.

<Evaluation of the Difference in Percent Residual OD>

The difference in a percent residual OD between the yellow ink and the magenta ink ($S_{|Y-M|}$), the difference in a percent residual OD between the magenta ink and the cyan ink ($S_{|M-C|}$), and the difference in a percent residual OD between the cyan ink and the yellow ink ($S_{|C-Y|}$) were respectively found. Further, the difference in a percent residual OD was evaluated on the basis of the following criteria. The results obtained are summarized in Tables 4 to 6.

Grades for Evaluation:

A: The difference in a percent residual OD was less than 20%.

B: The difference in a percent residual OD was 20% or more.

<Overall Quality>

On the basis of the above results, the samples were synthetically evaluated according to the following criteria of evaluation.

Grades of Evaluation:

A: Both of the evaluation of the percent residual OD and the difference in a percent residual OD were graded A.

B: Although the evaluation of the difference in a percent residual OD was graded A, the evaluation of the percent residual OD was partly graded B.

C: Although the evaluation of the difference in a percent residual OD was graded B, all of the evaluations of the percent residual OD were graded A.

D: The evaluation of the difference in a percent residual OD was partly graded B, and the evaluations of the percent residual OD was also partly graded B.

TABLE 1

| | | Yellow Ink | | | |
|---|---|---|---|---|---|
| | | Y1 | Y2 | Y3 | Y4 |
| Ink Composition (wt %) | C.I. Direct Yellow 86 | 3.2 | 1.6 | — | — |
| | C.I. Direct Yellow 132 | — | — | 3.2 | — |
| | C.I. Acid Yellow 23 | — | 1.6 | — | 3.2 |
| | Glycerin | 26.0 | 26.0 | 26.0 | 26.0 |
| | Dipropylene glycol propyl ether | 2.0 | 2.0 | 2.0 | 2.0 |
| | OLFINE ® E1010 *1 | 0.2 | 0.2 | 0.2 | 0.2 |
| | Proxel XL-2 (S) *2 | 0.2 | 0.2 | 0.2 | 0.2 |
| | Water | Balance | Balance | Balance | Balance |

*1: Acetylene glycol-based surfactant, manufactured by Nisshin Chemical Industry Co., Ltd.
*2: Adipropylene glycol solution containing 20 wt % of 1,2-benzisothiazolin-3-one (manufactured by Arch Chemicals Inc.)

TABLE 2

|  |  | Magenta Ink | | | | | | |
| --- | --- | --- | --- | --- | --- | --- | --- | --- |
|  |  | M1 | M2 | M3 | M4 | M5 | M6 | M7 |
| Ink Composition (wt %) | Project Fast Magenta 2 Liquid *1 | 3.2 | 1.6 | — | — | — | — | — |
|  | Dye (1-D) | — | — | — | 3.2 | — | — | — |
|  | Dye (1-E) | — | 1.6 | 3.2 | — | — | — | — |
|  | Dye (2-A) | — | — | — | — | 3.2 | — | — |
|  | Dye (2-B) | — | — | — | — | — | 3.2 | — |
|  | Dye (3) | — | — | — | — | — | — | 3.2 |
|  | Glycerin | 26.0 | 26.0 | 26.0 | 26.0 | 26.0 | 26.0 | 26.0 |
|  | Dipropylene glycol propyl ether | 2.0 | 2.0 | 2.0 | 2.0 | 2.0 | 2.0 | 2.0 |
|  | OLFINE ® E1010 *2 | 0.2 | 0.2 | 0.2 | 0.2 | 0.2 | 0.2 | 0.2 |
|  | Proxel XL-2 (S) *3 | 0.2 | 0.2 | 0.2 | 0.2 | 0.2 | 0.2 | 0.2 |
|  | Water | Balance | Balance | Balance | Balance | Balance | Balance | Balance |

*1: In terms of dye concentration (a 5% aqueous solution of the corresponding dye), magenta dye, manufactured by FUJIFILM Imaging Colorant Co., Ltd.
*2: Acetylene glycol-based surfactant, manufactured by Nisshin Chemical Industry Co., Ltd.
*3: A dipropylene glycol solution containing 20 wt % of 1,2-benzisothiazolin-3-one, manufactured by Arch Chemicals Inc.

TABLE 3

|  |  | Cyan Ink | | | | | | | |
| --- | --- | --- | --- | --- | --- | --- | --- | --- | --- |
|  |  | C1 | C2 | C3 | C4 | C5 | C6 | C7 | C8 |
| Ink Composition (wt %) | Project Fast Cyan 2 Liquid *1 | 3.8 | 1.9 | — | — | — | — | — | — |
|  | Dye (4-A) | — | 1.9 | 3.8 | — | — | — | — | — |
|  | Dye (4-B) | — | — | — | 3.8 | — | — | — | — |
|  | Dye (5-A) | — | — | — | — | 3.8 | — | — | — |
|  | Dye (5-B) | — | — | — | — | — | 3.8 | — | — |
|  | C.I. Direct Blue 199 | — | — | — | — | — | — | 3.8 | — |
|  | C.I. Acid Blue 9 | — | — | — | — | — | — | — | 3.8 |
|  | Glycerin | 26.0 | 26.0 | 26.0 | 26.0 | 26.0 | 26.0 | 26.0 | 26.0 |
|  | Dipropylene glycol propyl ether | 2.0 | 2.0 | 2.0 | 2.0 | 2.0 | 2.0 | 2.0 | 2.0 |
|  | OLFINE ® E1010 *2 | 0.2 | 0.2 | 0.2 | 0.2 | 0.2 | 0.2 | 0.2 | 0.2 |
|  | Proxel XL-2 (S) *3 | 0.2 | 0.2 | 0.2 | 0.2 | 0.2 | 0.2 | 0.2 | 0.2 |
|  | Water | Balance | Balance | Balance | Balance | Balance | Balance | Balance | Balance |

*1: In terms of dye concentration (a 6% aqueous solution of the corresponding dye), cyan dye, manufactured by FUJIFILM Imaging Colorant Co., Ltd.
*2: Acetylene glycol-based surfactant, manufactured by Nisshin Chemical Industry Co., Ltd.
*3: A dipropylene glycol solution containing 20 wt % of 1,2-benzisothiazolin-3-one, manufactured by Arch Chemicals Inc.

TABLE 4

|  | Example 1 | | | Example 2 | | | Example 3 | | | Example 4 | | |
| --- | --- | --- | --- | --- | --- | --- | --- | --- | --- | --- | --- | --- |
| Ink Set | Y1 | M1 | C1 | Y2 | M2 | C2 | Y2 | M3 | C3 | Y2 | M4 | C4 |
| OD value Before test | 0.89 | 0.93 | 0.60 | 0.82 | 0.93 | 0.57 | 0.82 | 0.92 | 0.53 | 0.82 | 0.91 | 0.55 |
| After test | 0.75 | 0.77 | 0.51 | 0.44 | 0.62 | 0.37 | 0.44 | 0.47 | 0.22 | 0.44 | 0.45 | 0.23 |
| Percent residual OD | 84% | 83% | 85% | 54% | 67% | 65% | 54% | 51% | 42% | 54% | 49% | 42% |
| Evaluation | A | A | A | A | A | A | A | A | A | A | A | A |
| |Difference in percent residual OD| | $S_{|Y-M|}$ 1% | $S_{|M-C|}$ 2% | $S_{|C-Y|}$ 1% | $S_{|Y-M|}$ 13% | $S_{|M-C|}$ 2% | $S_{|C-Y|}$ 11% | $S_{|Y-M|}$ 3% | $S_{|M-C|}$ 9% | $S_{|C-Y|}$ 12% | $S_{|Y-M|}$ 5% | $S_{|M-C|}$ 7% | $S_{|C-Y|}$ 12% |
| Evaluation | A | A | A | A | A | A | A | A | A | A | A | A |
| Overall quality |  | A |  |  | A |  |  | A |  |  | A |  |

TABLE 5

|  | Example 5 | | | Example 6 | | | Example 7 | | | Example 8 | | |
| --- | --- | --- | --- | --- | --- | --- | --- | --- | --- | --- | --- | --- |
| Ink Set | Y3 | M5 | C5 | Y3 | M6 | C6 | Y2 | M5 | C7 | Y4 | M7 | C8 |
| OD value Before test | 0.21 | 0.97 | 0.62 | 0.21 | 0.98 | 0.64 | 0.82 | 0.97 | 0.65 | 0.74 | 0.98 | 0.83 |
| After test | 0.12 | 0.48 | 0.29 | 0.12 | 0.47 | 0.29 | 0.44 | 0.48 | 0.31 | 0.18 | 0.26 | 0.29 |
| Percent residual OD | 57% | 49% | 47% | 57% | 48% | 45% | 54% | 49% | 48% | 24% | 27% | 35% |
| Evaluation | A | A | A | A | A | A | A | A | A | B | B | B |
| |Difference in percent residual OD| | $S_{|Y-M|}$ 8% | $S_{|M-C|}$ 2% | $S_{|C-Y|}$ 10% | $S_{|Y-M|}$ 9% | $S_{|M-C|}$ 3% | $S_{|C-Y|}$ 12% | $S_{|Y-M|}$ 5% | $S_{|M-C|}$ 1% | $S_{|C-Y|}$ 6% | $S_{|Y-M|}$ 3% | $S_{|M-C|}$ 8% | $S_{|C-Y|}$ 11% |

TABLE 5-continued

|  | Example 5 | | | Example 6 | | | Example 7 | | | Example 8 | | |
|---|---|---|---|---|---|---|---|---|---|---|---|---|
| Evaluation | A | A | A | A | A | A | A | A | A | A | A | A |
| Overall quality | A | | | A | | | A | | | B | | |

TABLE 6

|  |  | Comparative Example 1 | | | Comparative Example 2 | | | Comparative Example 3 | | | Comparative Example 4 | | |
|---|---|---|---|---|---|---|---|---|---|---|---|---|---|
| Ink Set | | Y1 | M3 | C7 | Y4 | M5 | C5 | Y2 | M7 | C7 | Y3 | M5 | C8 |
| OD value | Before test | 0.89 | 0.92 | 0.65 | 0.74 | 0.97 | 0.62 | 0.82 | 0.98 | 0.65 | 0.21 | 0.97 | 0.83 |
|  | After test | 0.75 | 0.47 | 0.31 | 0.18 | 0.48 | 0.29 | 0.44 | 0.25 | 0.31 | 0.12 | 0.48 | 0.29 |
| Percent residual OD | | 84% | 51% | 48% | 24% | 49% | 47% | 54% | 27% | 48% | 57% | 49% | 35% |
| Evaluation | | A | A | A | B | A | A | A | B | A | A | A | B |
| \|Difference in percent residual OD\| | | $S_{\|Y-M\|}$ 33% | $S_{\|M-C\|}$ 3% | $S_{\|C-Y\|}$ 36% | $S_{\|Y-M\|}$ 25% | $S_{\|M-C\|}$ 2% | $S_{\|C-Y\|}$ 23% | $S_{\|Y-M\|}$ 27% | $S_{\|M-C\|}$ 21% | $S_{\|C-Y\|}$ 6% | $S_{\|Y-M\|}$ 8% | $S_{\|M-C\|}$ 14% | $S_{\|C-Y\|}$ 22% |
| Evaluation | | B | A | B | B | A | B | B | B | A | A | A | B |
| Overall quality | | C | | | D | | | D | | | D | | |

In the case of the ink sets in Examples 1 to 7, the percent residual OD is high in each of the yellow ink, the magenta ink and the cyan ink, and the difference in the percent residual OD is also good. In the case of the ink set in Example 8, the percent residual OD is low as compared with the samples in other examples, but the difference in the percent residual OD is good.

In the case of the ink set in Comparative Example 1, the percent residual OD is high in each of the yellow ink, the magenta ink and the cyan ink, but the percent residual OD of the yellow ink is too high as compared with the residual rates of OD values of other inks, so that the difference in the percent residual OD is poor. In the case of the ink set in Comparative Example 2, the percent residual OD of the yellow ink is too low as compared with those of other inks, so that the difference in the percent residual OD is poor. In the case of the ink set in Comparative Example 3, the percent residual OD of the magenta ink is low as compared with those of other inks, so that the difference in the percent residual OD is not good. In the case of the ink set in Comparative Example 4, the percent residual OD of the cyan ink is low as compared with those of other inks, so that the difference in the percent residual OD is poor.

Although embodiments of the present disclosure have been described in detail herein, the scope of the disclosure is not limited thereto. It will be appreciated by those of ordinary skill in the relevant art that various modifications may be made without departing from the scope of the disclosure. Accordingly, the embodiments disclosed herein are exemplary. It is to be understood that the scope of the disclosure is not to be limited thereby, but is to be determined by the claims which follow.

What is claimed is:

1. An ink-jet ink set comprising a yellow ink, a magenta ink and a cyan ink,
wherein the yellow ink comprises a colorant in an amount of about 0.1 wt % to about 20 wt %, said colorant comprising C.I. Direct Yellow 132, C.I. Direct Yellow 86, or C.I. Acid Yellow 23,
wherein the magenta ink comprises a colorant in an amount of about 0.1 wt % to about 20 wt % and said colorant has general formula I:

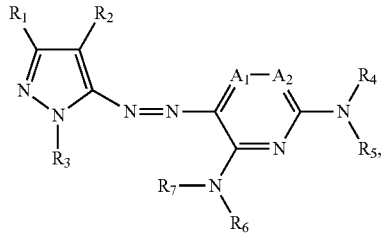

wherein $R_1$ represents a hydrogen atom, an alkyl group, a substituted alkyl group, an aryl group, or a substituted aryl group, $R_2$ represents a hydrogen atom, a halogen atom, or a cyano group, $R_3$ represents a hydrogen atom, an alkyl group, a substituted alkyl group, an aryl group, a substituted aryl group, a heterocyclic group, or a substituted heterocyclic group, $R_4$, $R_5$, $R_6$ and $R_7$ each represent a hydrogen atom, an alkyl group, a substituted alkyl group, an aryl group, a substituted aryl group, a heterocyclic group, a substituted heterocyclic group, a sulfonyl group, a substituted sulfonyl group, an acyl group, or a substituted acyl group, wherein $R_4$ and $R_5$ do not represent a hydrogen atom at the same time, and $R_6$ and $R_7$ do not represent a hydrogen atom at the same time, and $A_1$ and $A_2$ each represent a carbon atom, a substituted carbon atom, or a nitrogen atom,
or said colorant has general formula II:

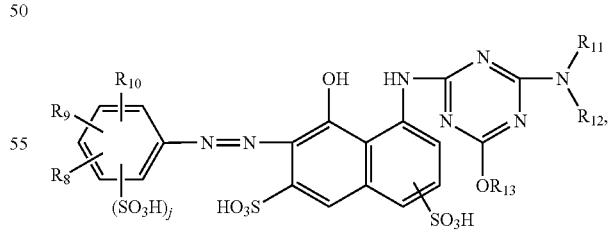

wherein $R_8$, $R_9$ and $R_{10}$ each represent an alkyl group, a substituted alkyl group, an alkoxyl group, a substituted alkoxyl group, a halogen atom, a hydrogen atom, a hydroxyl group, a carbamoyl group, a substituted carbamoyl group, a sulfamoyl group, a substituted sulfamoyl group, an amino group, a substituted amino group, a nitro group, a sulfonate group, an alkylsulfonyl group, a substituted alkylsulfonyl group, an arylsulfonyl group, a substituted arylsulfonyl group, a carboxyl group, or a carboxylate group, j represents a number of 0, 1 or 2 $R_{11}$, $R_{12}$ and $R_{13}$ each represent a hydrogen atom, an alkyl group, a substituted alkyl group, an alkenyl group, a substituted alkenyl group, an aryl group, a substituted aryl group, an aralkyl group, a substituted aralkyl group, an alicyclic group, a substituted alicyclic group, a heterocyclic group, or a substituted heterocyclic group, or said colorant has general formula III:

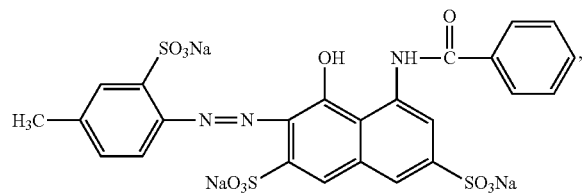

wherein the cyan ink comprises a colorant in an amount of about 0.1 wt % to about 20 wt % and said colorant has general formula IV:

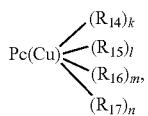

wherein Pc has general formula VI:

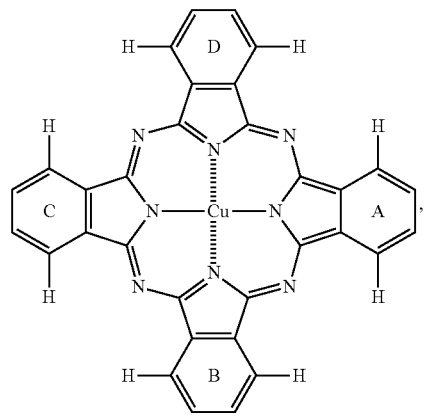

$R_{14}$, $R_{15}$, $R_{16}$ and $R_{17}$ each represented —$SO_2$—$R_a$, —$SO_2NR_bR_c$, or —$CO_2$—$R_a$, and not all of $R_{14}$, $R_{15}$, $R_{16}$ and $R_{17}$ are the same but at least one of $R_{14}$, $R_{15}$, $R_{16}$ and $R_{17}$ comprises an ionic hydrophilic, at least one of $R_{14}$, $R_{15}$, $R_{16}$ and $R_{17}$ is present on each of the four benzene rings A, B, C and D in the general formula VI, $R_a$ represents a substituted or unsubstituted alkyl group, $R_b$ represents a hydrogen atom, or a substituted or unsubstituted alkyl group, $R_c$ represents a substituted or unsubstituted alkyl group, $0<k<8$, $0<l<8$, $0\leq m<8$, $0\leq n<8$, and $4\leq k+l+m+n\leq 8$, or said colorant has general formula V:

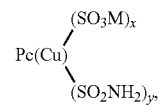

wherein Pc has general formula VI, with an $SO_3M$ group or an $SO_2NH_2$ group are present on at least one of the four benzene rings A, B, C and D general formula VI, M represents a lithium ion, a sodium ion, or a potassium ion, $0<x<4$, $0<y<4$, and $2\leq x+y\leq 5$, and wherein the absolute value of the difference in a percent residual optical density by a water resistance test of any two inks is less than about 20%.

2. An ink-jet ink set according to claim 1, wherein the absolute value of the difference in a percent residual optical density by a water resistance test of any two inks is less than about 15%.

3. An ink-jet ink set according to claim 1, wherein the percent residual optical density by a water resistance test of every ink is about 40% or more.

4. An ink-jet ink set according to claim 2, wherein the percent residual optical density by a water resistance test of every ink is about 40% or more.

5. An ink-jet ink set according to claim 1, wherein a percent residual optical density by a water resistance test is calculated by
measuring an initial optical density of an ink-jet image printed on plain paper to obtain an initial optical density measurement,
immersing the image printed on plain paper in water at about 25° C. for about 5 minutes,
drying the image printed on plain paper by natural drying,
measuring a second optical density to obtain a second optical density measurement,
dividing the second optical density measurement by the initial optical density measurement to produce a quotient, and
multiplying the quotient by 100.

6. An ink-jet ink set according to claim 2, wherein a percent residual optical density by a water resistance test is calculated by
measuring an initial optical density of an ink-jet image printed on plain paper to obtain an initial optical density measurement,
immersing the image printed on plain paper in water at about 25° C. for about 5 minutes,
drying the image printed on plain paper by natural drying,
measuring a second optical density to obtain a second optical density measurement,
dividing the second optical density measurement by the initial optical density measurement to produce a quotient, and
multiplying the quotient by 100.

7. A method of manufacturing an ink-jet ink set comprising:
selecting a yellow ink, a magenta ink and a cyan ink so that the absolute value of the difference in a percent residual optical density by a water resistance test of any two inks is less than about 20%; and
combining these inks to form an ink set,
wherein the yellow ink comprises a colorant in an amount of about 0.1 wt % to about 20 wt %, said colorant comprising C.I. Direct Yellow 132, C.I. Direct Yellow 86, or C.I. Acid Yellow 23,
wherein the magenta ink comprises a colorant in an amount of about 0.1 wt % to about 20 wt % and said colorant has general formula I:

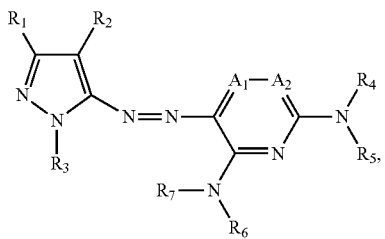

wherein $R_1$ represents a hydrogen atom, an alkyl group, a substituted alkyl group, an aryl group, or a substituted aryl group, $R_2$ represents a hydrogen atom, a halogen atom, or a cyano group, $R_3$ represents a hydrogen atom, an alkyl group, a substituted alkyl group, an aryl group, a substituted aryl group, a heterocyclic group, or a substituted heterocyclic group, $R_4$, $R_5$, $R_6$ and $R_7$ each represent a hydrogen atom, an alkyl group, a substituted alkyl group, an aryl group, a substituted aryl group, a heterocyclic group, a substituted heterocyclic group, a sulfonyl group, a substituted sulfonyl group, an acyl group, or a substituted acyl group, wherein $R_4$ and $R_5$ do not represent a hydrogen atom at the same time, and $R_6$ and $R_7$ do not represent a hydrogen atom at the same time, and $A_1$ and $A_2$ each represent a carbon atom, a substituted carbon atom, or a nitrogen atom, or said colorant has general formula II:

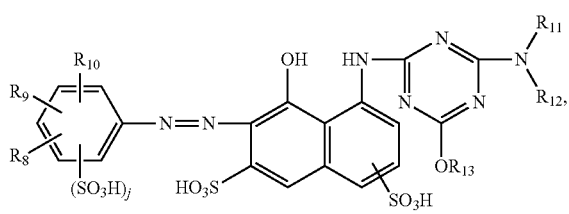

wherein $R_8$, $R_9$ and $R_{10}$ each represent an alkyl group, a substituted alkyl group, an alkoxyl group, a substituted alkoxyl group, a halogen atom, a hydrogen atom, a hydroxyl group, a carbamoyl group, a substituted carbamoyl group, a sulfamoyl group, a substituted sulfamoyl group, an amino group, a substituted amino group, a nitro group, a sulfonate group, an alkylsulfonyl group, a substituted alkylsulfonyl group, an arylsulfonyl group, a substituted arylsulfonyl group, a carboxyl group, or a carboxylate group, j represents a number of 0, 1 or 2 $R_{11}$, $R_{12}$ and $R_{13}$ each represent a hydrogen atom, an alkyl group, a substituted alkyl group, an alkenyl group, a substituted alkenyl group, an aryl group, a substituted aryl group, an aralkyl group, a substituted aralkyl group, an alicyclic group, a substituted alicyclic group, a heterocyclic group, or a substituted heterocyclic group, or said colorant has general formula III:

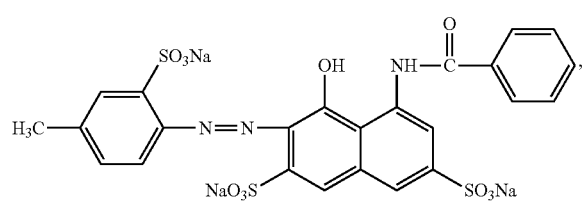

and wherein the cyan ink comprises a colorant in an amount of about 0.1 wt % to about 20 wt % and said colorant has general formula IV:

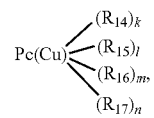

wherein Pc has general formula VI:

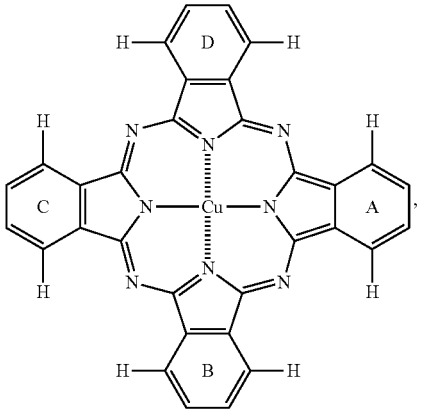

$R_{14}$, $R_{15}$, $R_{16}$ and $R_{17}$ each represented $—SO_2—R_a$, $—SO_2NR_bR_c$, or $—CO_2—R_a$, and not all of $R_{14}$, $R_{15}$, $R_{16}$ and $R_{17}$ are the same but at least one of $R_{14}$, $R_{15}$, $R_{16}$ and $R_{17}$ comprises an ionic hydrophilic, at least one of $R_{14}$, $R_{15}$, $R_{16}$ and $R_{17}$ is present on each of the four benzene rings A, B, C and D in the general formula VI, $R_a$ represents a substituted or unsubstituted alkyl group, $R_b$ represents a hydrogen atom, or a substituted or unsubstituted alkyl group, $R_c$ represents a substituted or unsubstituted alkyl group, $0<k<8$, $0<l<8$, $0 \leq m<8$, $0<n<8$, and $4 \leq k+l+m+n \leq 8$, or said colorant has general formula V:

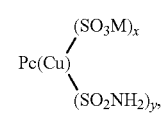

wherein Pc has general formula VI, with an $SO_3M$ group or an $SO_2NH_2$ group are present on at least one of the four benzene rings A, B, C and D general formula VI, M represents a lithium ion, a sodium ion, or a potassium ion, $0<x<4$, $0<y<4$, and $2 \leq x+y \leq 5$.

8. A method of manufacturing an ink-jet ink set according to claim 7, wherein the absolute value of the difference in a percent residual optical density by a water resistance test of any two inks is less than about 15%.

9. A method of manufacturing an ink-jet ink set according to claim 7, wherein the percent residual optical density by a water resistance test of every ink is about 40% or more.

10. A method of manufacturing an ink-jet ink set according to claim 8, wherein the percent residual optical density by a water resistance test of every ink is about 40% or more.

11. A method of manufacturing an ink-jet ink set according to claim 7, wherein a percent residual optical density by a water resistance test is calculated by measuring an initial optical density of an ink-jet image printed on plain paper to obtain an initial optical density measurement, immersing the image printed on plain paper in water at about 25° C. for about 5 minutes, drying the image printed on plain paper by natural drying, measuring a second optical density to obtain a second optical density measurement, dividing the second optical density measurement by the initial optical density measurement to produce a quotient, and multiplying the quotient by 100.

12. A method of manufacturing an ink-jet ink set according to claim 8, wherein a percent residual optical density by a water resistance test is calculated by measuring an initial optical density of an ink-jet image printed on plain paper to obtain an initial optical density measurement, immersing the image printed on plain paper in water at about 25° C. for about 5 minutes, drying the image printed on plain paper by natural drying, measuring a second optical density to obtain a second optical density measurement, dividing the second optical density measurement by the initial optical density measurement to produce a quotient, and multiplying the quotient by 100.

13. An ink-set according to claim 1, wherein magenta ink comprises a colorant with the general formula:

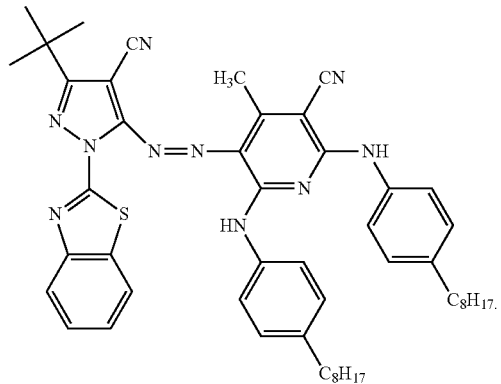

14. An ink-set according to claim 1, wherein the magenta ink comprises a colorant with the general formula:

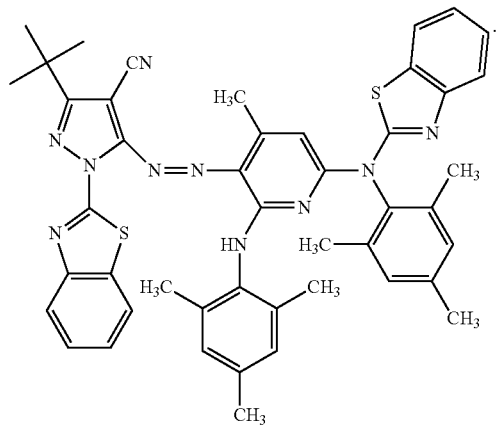

15. An ink-set according to claim 1, wherein the magenta ink comprises a colorant with the general formula:

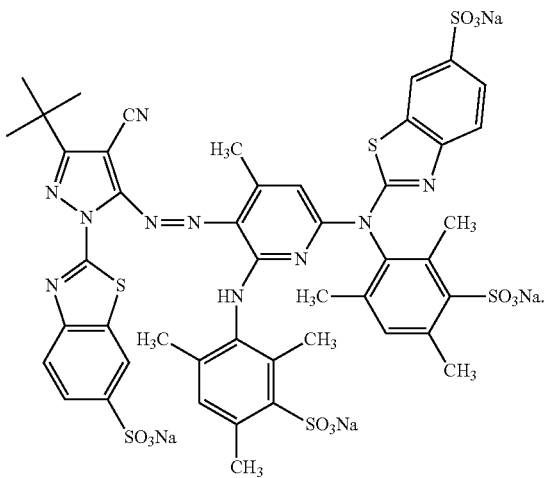

16. An ink-set according to claim 1, wherein the magenta ink comprises a colorant with the general formula:

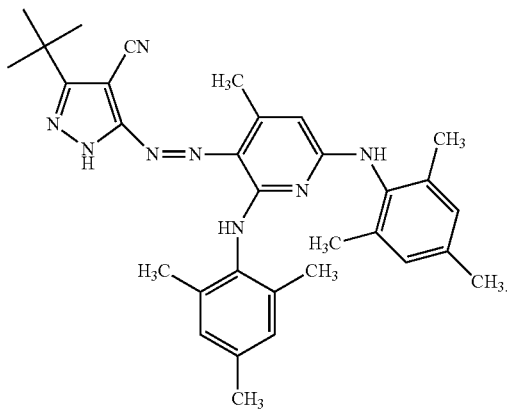

17. An ink-set according to claim 1, wherein the magenta ink comprises a colorant with the general formula:

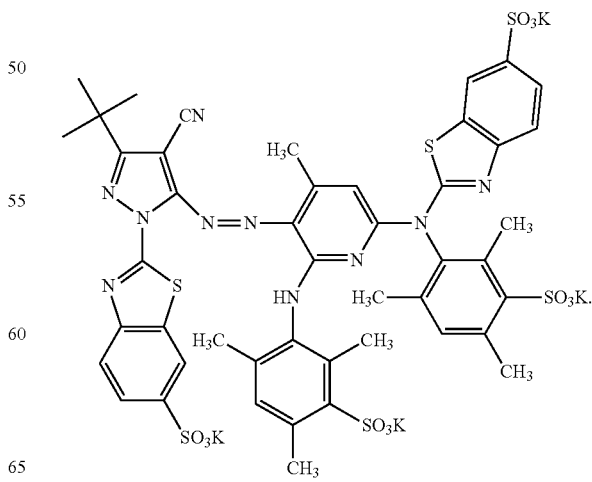

18. An ink-set according to claim 1, wherein the magenta ink comprises a colorant with the general formula:

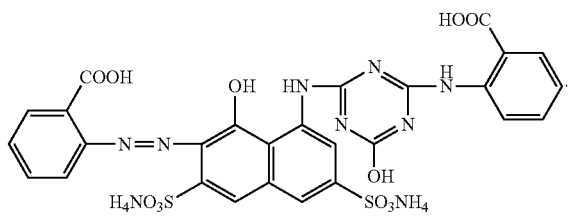

19. An ink-set according to claim 1, wherein the magenta ink comprises a colorant with the general formula:

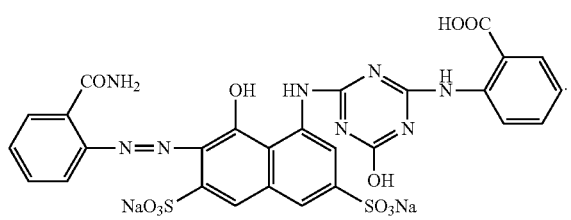

20. An ink-set according to claim 1, wherein the magenta ink comprises a colorant with the general formula:

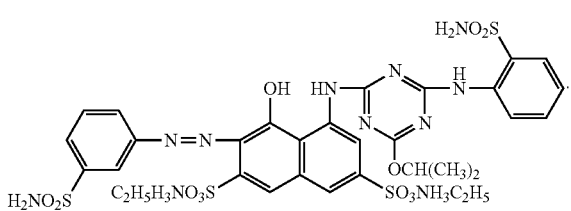

21. An ink-set according to claim 1, wherein the magenta ink comprises a colorant with the general formula:

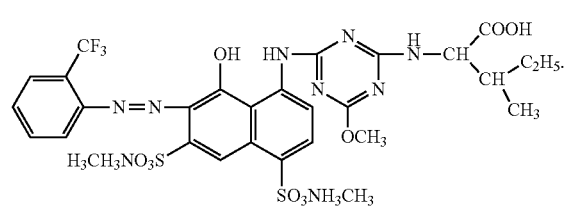

22. An ink-set according to claim 1, wherein the magenta ink comprises a colorant with the general formula:

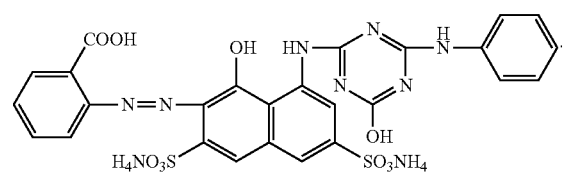

23. An ink-set according to claim 1, wherein the cyan ink comprises a colorant with the general formula:

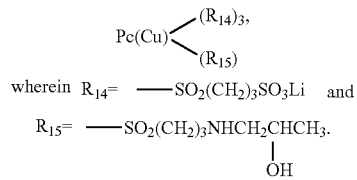

wherein $R_{14}$= —$SO_2(CH_2)_3SO_3Li$ and $R_{15}$= —$SO_2(CH_2)_3NHCH_2CHCH_3$.
                                   |
                                   OH

24. An ink-set according to claim 1, wherein the cyan ink comprises a colorant with the general formula:

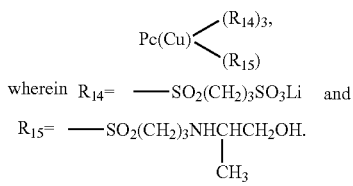

wherein $R_{14}$= —$SO_2(CH_2)_3SO_3Li$ and $R_{15}$= —$SO_2(CH_2)_3NHCHCH_2OH$.
                                |
                                $CH_3$

25. An ink-set according to claim 1, wherein the cyan ink comprises a colorant with the general formula:

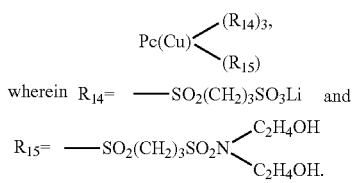

wherein $R_{14}$= —$SO_2(CH_2)_3SO_3Li$ and $R_{15}$= —$SO_2(CH_2)_3SO_2N\begin{cases}C_2H_4OH \\ C_2H_4OH\end{cases}$.

26. An ink-set according to claim 1, wherein the cyan ink comprises a colorant with the general formula:

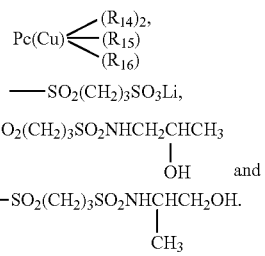

wherein $R_{14}$= —$SO_2(CH_2)_3SO_3Li$, $R_{15}$= —$SO_2(CH_2)_3SO_2NHCH_2CHCH_3$
                                      |
                                      OH   and $R_{16}$= —$SO_2(CH_2)_3SO_2NHCHCH_2OH$.
                                |
                                $CH_3$

27. An ink-set according to claim 1, wherein the cyan ink comprises a colorant with the general formula:

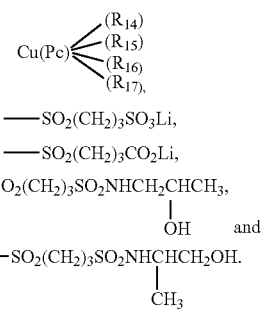

wherein $R_{14}$= —$SO_2(CH_2)_3SO_3Li$, $R_{15}$= —$SO_2(CH_2)_3CO_2Li$, $R_{16}$= —$SO_2(CH_2)_3SO_2NHCH_2CHCH_3$,
                                      |
                                      OH   and $R_{17}$= —$SO_2(CH_2)_3SO_2NHCHCH_2OH$.
                                |
                                $CH_3$

* * * * *